(12) United States Patent
Yanagisawa

(10) Patent No.: US 11,940,664 B2
(45) Date of Patent: Mar. 26, 2024

(54) LENS UNIT, PROJECTION OPTICAL SYSTEM, AND PROJECTOR THAT ACCURATELY KEEP A THICKNESS OF A JOINTED LENS AT A DESIRED VALUE

(71) Applicant: SEIKO EPSON CORPORATION, Tokyo (JP)

(72) Inventor: Hirotaka Yanagisawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/127,141

(22) Filed: Dec. 18, 2020

(65) Prior Publication Data
US 2021/0191092 A1 Jun. 24, 2021

(30) Foreign Application Priority Data
Dec. 19, 2019 (JP) .................................. 2019-228979

(51) Int. Cl.
*G02B 7/02* (2021.01)
*G02B 13/16* (2006.01)
*G03B 21/28* (2006.01)

(52) U.S. Cl.
CPC .............. *G02B 7/026* (2013.01); *G02B 7/021* (2013.01); *G02B 7/022* (2013.01); *G02B 7/023* (2013.01); *G02B 7/025* (2013.01); *G02B 13/16* (2013.01); *G03B 21/28* (2013.01)

(58) Field of Classification Search
CPC ........ G02B 13/16; G02B 7/025; G02B 7/026; G02B 7/004; G02B 7/021; G02B 7/022; G02B 7/023; G03B 21/28
See application file for complete search history.

(56) References Cited

U.S. PATENT DOCUMENTS

| | | | |
|---|---|---|---|
| 4,992,809 A | 2/1991 | Nozaki et al. | |
| 5,024,509 A * | 6/1991 | Kurihara | G02B 7/022 359/741 |
| 5,225,927 A | 7/1993 | Nozaki et al. | |
| 5,249,082 A * | 9/1993 | Newman | G02B 7/028 359/813 |

(Continued)

FOREIGN PATENT DOCUMENTS

| | | |
|---|---|---|
| JP | H3-139606 A | 6/1991 |
| JP | H6-347612 A | 12/1994 |

(Continued)

*Primary Examiner* — Bao-Luan Q Le
(74) *Attorney, Agent, or Firm* — Oliff PLC

(57) ABSTRACT

A lens unit includes a jointed lens having a first optical member, a second optical member disposed on an optical axis of the first optical member, and a jointing member having a light transmissive property and disposed between the first optical member and the second optical member, and a holding mechanism configured to hold the first and second optical members. The holding mechanism holds the first and second optical members so that a distance along an optical axis direction between a first lateral surface at an opposite side to a second optical member side in the first optical member and a second lateral surface at an opposite side to a first optical member side in the second optical member becomes a preset distance. The jointing member adheres to the first optical member and the second optical member so that the distance becomes the preset distance.

8 Claims, 27 Drawing Sheets

(56) References Cited

U.S. PATENT DOCUMENTS

| | | | |
|---|---|---|---|
| 5,798,876 A * | 8/1998 | Nagano | G02B 7/021 |
| | | | 359/819 |
| 5,969,887 A * | 10/1999 | Hagimori | G02B 7/026 |
| | | | 359/811 |
| 6,816,322 B2 | 11/2004 | Abe et al. | |
| 7,048,388 B2 | 5/2006 | Takaura et al. | |
| 7,433,019 B2 * | 10/2008 | Kiuchi | G02B 7/023 |
| | | | 378/34 |
| 7,549,755 B2 | 6/2009 | Suzuki | |
| 8,934,183 B2 | 1/2015 | Maetaki | |
| 9,134,501 B2 * | 9/2015 | Schaffer | G02B 7/026 |
| 2003/0011902 A1 * | 1/2003 | Nishimura | G02B 7/025 |
| | | | 359/819 |
| 2003/0086184 A1 | 5/2003 | Abe et al. | |
| 2004/0156117 A1 | 8/2004 | Takaura et al. | |
| 2004/0179277 A1 * | 9/2004 | Stallard | G02B 7/021 |
| | | | 359/811 |
| 2006/0193036 A1 | 8/2006 | Suzuki | |
| 2007/0091473 A1 * | 4/2007 | Shimizu | B29D 11/0073 |
| | | | 359/796 |
| 2007/0201151 A1 * | 8/2007 | Schletterer | G02B 7/022 |
| | | | 359/819 |
| 2009/0225455 A1 * | 9/2009 | Kawasaki | G02B 13/04 |
| | | | 359/830 |
| 2009/0244508 A1 * | 10/2009 | Schoeppach | G03F 7/70825 |
| | | | 355/67 |
| 2010/0053782 A1 * | 3/2010 | Sukigara | G02B 7/021 |
| | | | 359/819 |
| 2010/0116973 A1 * | 5/2010 | Maetaki | G02B 3/00 |
| | | | 250/216 |
| 2012/0262803 A1 * | 10/2012 | Matsuo | G02B 15/143507 |
| | | | 359/716 |
| 2015/0131175 A1 * | 5/2015 | Lamontagne | G02B 7/026 |
| | | | 359/830 |
| 2015/0323767 A1 | 11/2015 | Morikuni et al. | |
| 2016/0116830 A1 * | 4/2016 | Lin | G02B 17/08 |
| | | | 353/97 |
| 2017/0023762 A1 * | 1/2017 | Tobita | G02B 27/0018 |
| 2018/0239102 A1 * | 8/2018 | Grejda | G02B 7/028 |
| 2019/0011684 A1 | 1/2019 | Ishihara et al. | |
| 2019/0137656 A1 * | 5/2019 | Dunn | C03B 23/22 |
| 2019/0324294 A1 | 10/2019 | Kamibeppu et al. | |
| 2020/0209718 A1 * | 7/2020 | Gao | G02B 7/08 |
| 2021/0080673 A1 * | 3/2021 | Sohn | G02B 13/0085 |
| 2022/0137434 A1 | 5/2022 | Kamibeppu et al. | |

FOREIGN PATENT DOCUMENTS

| | | |
|---|---|---|
| JP | 2003-140037 A | 5/2003 |
| JP | 2004-246042 A | 9/2004 |
| JP | 2006-235516 A | 9/2006 |
| JP | 2007-316674 A | 12/2007 |
| JP | 2010-117472 A | 5/2010 |
| JP | 2010-224205 A | 10/2010 |
| JP | 2010-266496 A | 11/2010 |
| JP | 2011-053332 A | 3/2011 |
| JP | 5235619 B2 | 7/2013 |
| JP | 2015-215478 A | 12/2015 |
| JP | 2017-156712 A | 9/2017 |
| JP | 2017-156713 A | 9/2017 |
| JP | 2017-156714 A | 9/2017 |
| JP | WO2018/123195 A1 | 7/2019 |
| JP | 2019-133061 A | 8/2019 |
| JP | 2020-194115 A | 12/2020 |

* cited by examiner

LENS UNIT, PROJECTION OPTICAL SYSTEM, AND PROJECTOR THAT ACCURATELY KEEP A THICKNESS OF A JOINTED LENS AT A DESIRED VALUE

The present application is based on, and claims priority from JP Application Serial Number 2019-228979, filed Dec. 19, 2019, the disclosure of which is hereby incorporated by reference herein in its entirety.

BACKGROUND

1. Technical Field

The present disclosure relates to a lens unit, a projection optical system, and a projector.

2. Related Art

A jointed lens which can be adopted as a lens which constitutes a projection optical system is described in JP-A-2003-140037 (Document 1), JP-A-2010-266496 (Document 2), JP-A-2011-053332 (document 3), and JP-A-06-347612 (Document 4). Document 1 discloses a jointed lens obtained by jointing two or three lenses to each other with an adhesive. In Document 1, the curvature radius of the joint surface of the two lenses adjacent to each other is specified to thereby prevent the two lenses from being separated from each other. Document 2 discloses a jointed lens obtained by jointing two lenses to each other with resin. In Document 2, the thermal expansion coefficients of the lenses and the resin are specified to thereby prevent the stress from occurring. Document 3 discloses a jointed lens obtained by jointing two lenses to each other with resin. In Document 3, a tilted surface part is provided outside the effective diameter of each lens. In Document 3, the two lenses are made to have contact with each other via the tilted surface part to thereby make the optical axes of the two lenses coincide with each other. Document 4 discloses a jointed lens obtained by jointing two lenses to each other with an adhesive. In Document 4, a planar section in a direction perpendicular to a surface axis is disposed outside the effective diameter of each of the lenses. In Document 4, the two lenses are bonded to each other with reference to the planar sections to thereby prevent each of the lenses from tilting.

There has been proposed no configuration of accurately keeping the thickness of the jointed lens having been bonded in a desired value.

SUMMARY

In view of the problems described above, a lens unit according to the present disclosure includes a jointed lens having a first optical member, a second optical member disposed on an optical axis of the first optical member, and a jointing member having a light transmissive property and disposed between the first optical member and the second optical member, and a holding mechanism configured to hold the first optical member and the second optical member. The holding mechanism holds the first optical member and the second optical member so that a distance along an optical axis direction of the optical axis between a first lateral surface at an opposite side to a second optical member side in the first optical member and a second lateral surface at an opposite side to a first optical member side in the second optical member becomes a preset distance. The jointing member adheres to the first optical member and the second optical member so that the distance becomes the preset distance.

A projection optical system according to the present disclosure includes the lens unit described above disposed between a reduction-side imaging plane and an elargement-side imaging plane.

A projector according to the present disclosure includes a light source, a light modulator configured to modulate light emitted from the light source to provide an image to the reduction-side imaging plane, and the projection optical system described above configured to project the image.

DESCRIPTION OF AN EXEMPLARY EMBODIMENT

A lens unit, a projection optical system, and a projector according to an embodiment of the present disclosure will hereinafter be described with reference to the drawings. First, an example of a lens unit adoptable to the projection optical system will hereinafter be described. Then, an overall configuration of the projector will be described. Subsequently, a projection optical system equipped with the lens unit will be described as an example of the projection optical system which can be installed in the projector.

Lens Unit According to Practical Example 1

Figure 1:
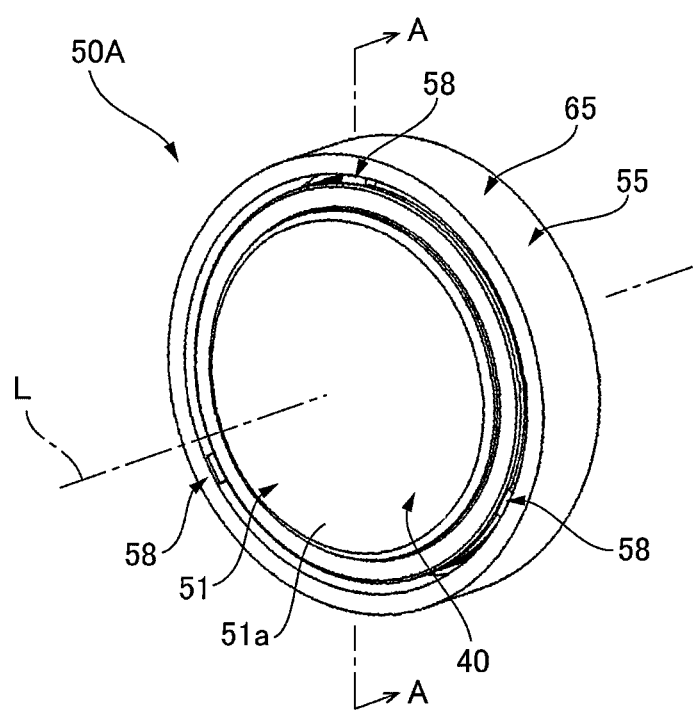
FIG. 1 is a perspective view of a lens unit according to Practical Example 1.
Figure 2:
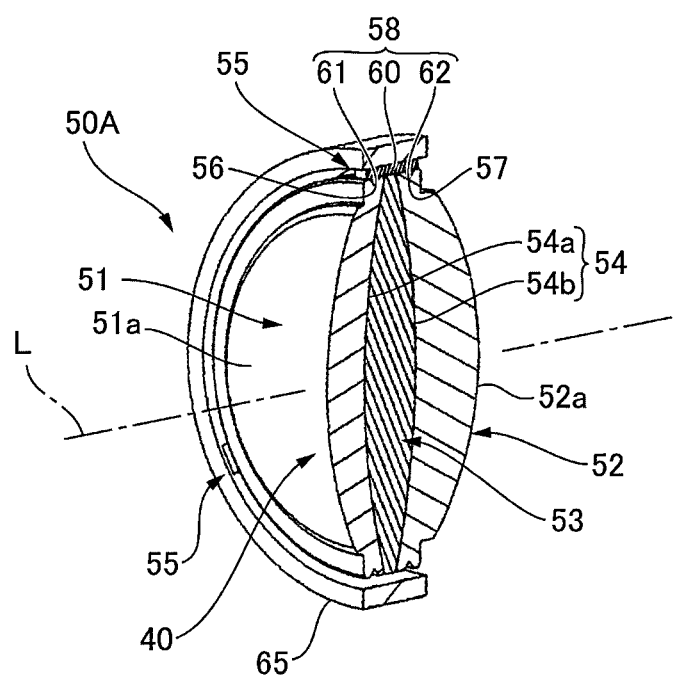
FIG. 2 is a perspective view of the lens unit shown in FIG. 1 when being cut along the line A-A.
Figure 3:
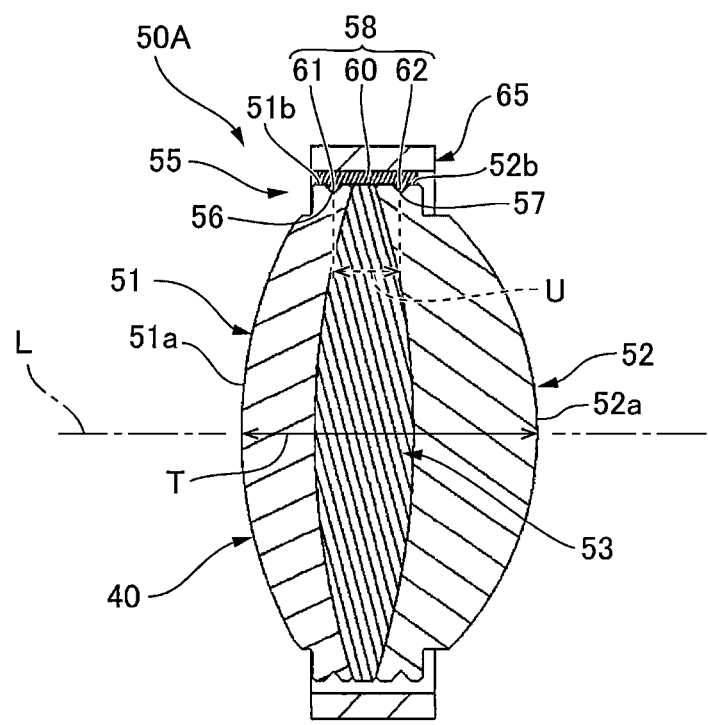
FIG. 3 is a cross-sectional view of the lens unit shown in FIG. 1.

FIG. 1 is a perspective view of a lens unit according to Practical Example 1. FIG. 2 is a perspective view of the lens unit shown in FIG. 1 when being cut along the line A-A. FIG. 3 is a cross-sectional view of the lens unit shown in FIG. 1. As shown in FIG. 1, the lens unit 50A according to Practical Example 1 has a jointed lens 40 and a holding mechanism 55.

As shown in FIG. 2, as optical members, the jointed lens 40 is provided with a first lens 51, a second lens 52 arranged on the optical axis L of the first lens 51, and a third lens 53 disposed between the first lens 51 and the second lens 52. Further, the jointed lens 40 is provided with a jointing member 54 located between the first lens 51 and the second lens 52. The jointing member 54 has a light transmissive property. The jointing member 54 is elastically deformable, and adheres to the two lenses located before and after the jointing member 54 in the optical axis L direction. As the jointing member 54, the jointed lens 40 is provided with a first jointing member 54a and a second jointing member 54b, wherein the first jointing member 54a is located between the first lens 51 and the third lens 53, and adheres to the first lens 51 and the third lens 53, and the second jointing member 54b is located between the third lens 53 and the second lens 52, and adheres to the third lens 53 and the second lens 52. In the present example, the jointing member 54 is an adhesive. As the jointing member 54, a gel resin member can be adopted.

The holding mechanism 55 holds the first lens 51 and the second lens 52. As shown in FIG. 3, the holding mechanism 55 keeps the distance between a first-lens lateral surface 51a at the opposite side to the second lens 52 in the first lens 51 and a second-lens lateral surface 52a at the opposite side to the first lens 51 in the second lens 52 in a preset distance T set in advance. The holding mechanism 55 is provided with a first recessed part 56 provided to a first ring-like outer circumferential surface 51b along the optical axis L of the first lens 51, a second recessed part 57 provided to a second ring-like outer circumferential surface 52b around the optical axis L of the second lens 52, and inter-surface distance keeping members 58 each disposed at an outer side in a radial direction of the first lens 51 and the second lens 52. The first recessed part 56 and the second recessed part 57 correspond respectively to a first latched part and a second latched part to be engaged with the inter-surface distance keeping members 58.

The first recessed part 56 of the first lens 51 is disposed outside an effective ray range of the first lens 51. The second recessed part 57 of the second lens 52 is disposed outside an effective ray range of the second lens 52. The first recessed part 56 of the first lens 51 and the second recessed part 57 of the second lens 52 are each disposed in the entire circumference around the optical axis L. The holding mechanism 55 is provided with three inter-surface distance keeping members 58 as the inter-surface distance keeping members 58. As shown in FIG. 1, the three inter-surface distance keeping members 58 are disposed at regular angular intervals.

As shown in FIG. 3, the inter-surface distance keeping members 58 are each provided with a main body part 60 extending in the optical axis L direction, a first protrusion 61 protruding toward the inner side in the radial direction from the main body part 60, and a second protrusion 62 protruding toward the inner side in the radial direction at a position distant as much as a predetermined distance U from the first protrusion 61 in the optical axis L direction. The first protrusion 61 is fitted into the first recessed part 56 of the first lens 51 from the outer side in the radial direction. The second protrusion 62 is fitted into the second recessed part 57 of the second lens 52 from the outer side in the radial direction. In other words, the first protrusion 61 is a first latch part to be engaged with the first recessed part 56, and the second protrusion 62 is a second latch part to be fitted into the second recessed part 57. In the present example, the inter-surface distance keeping members 58 are made of metal.

Further, the lens unit 50A is provided with a holding ring 65 for holding the three inter-surface distance keeping members 58 from the outer circumferential side. The holding ring 65 makes contact with each of the inter-surface distance keeping members 58 from the outer circumferential side.

According to the present example, the first protrusion 61 of the inter-surface distance keeping member 58 is fitted into the first recessed part 56 of the first lens 51 from the outer side in the radial direction, and the second protrusion 62 distant as much as the predetermined distance U from the first protrusion 61 in the optical axis L direction is fitted into the second recessed part 57 of the second lens 52 from the outer side in the radial direction. Thus, since the positions of the first lens 51 and the second lens 52 in the optical axis L direction can be defined, the distance between the first-lens lateral surface 51a of the first lens 51 and the second-lens lateral surface 52a of the second lens 52 can be kept in the preset distance T set in advance.

Here, the first jointing member 54a and the second jointing member 54b are elastically deformable. Therefore, when the distance between the first lens 51 and the second lens 52 changes for setting the distance between the first lens 51 and the second lens 52 to the preset distance T, the first jointing member 54a changes in the thickness in the optical axis L direction to keep the state of adhering to the first lens 51 and the third lens 53. Further, the second jointing member 54b also changes in the thickness in the optical axis L direction to keep the state of adhering to the third lens 53 and the second lens 52.

Lens Unit According to Practical Example 2

Figure 4:
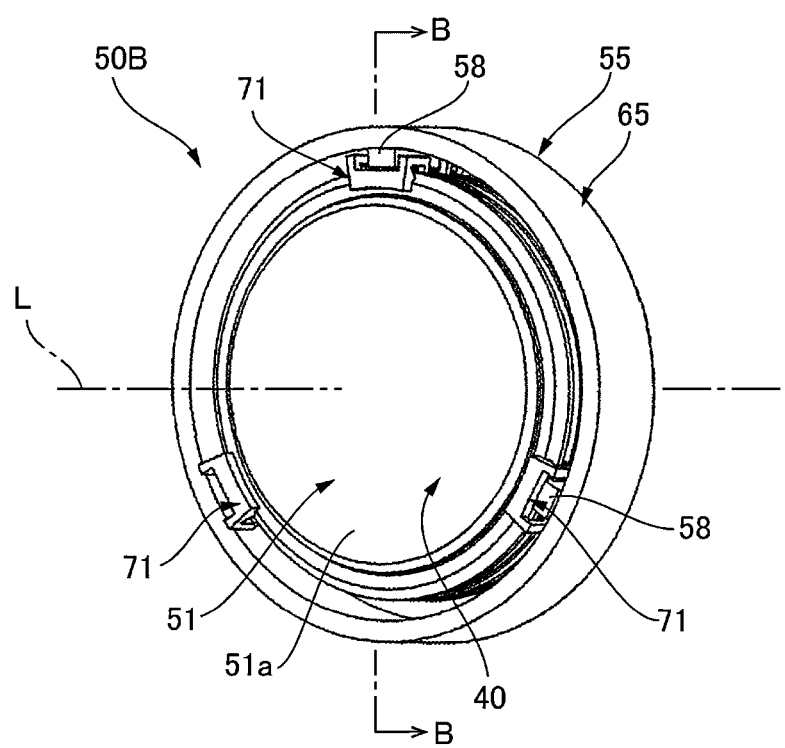
FIG. 4 is a perspective view of a lens unit according to Practical Example 2.
Figure 5:
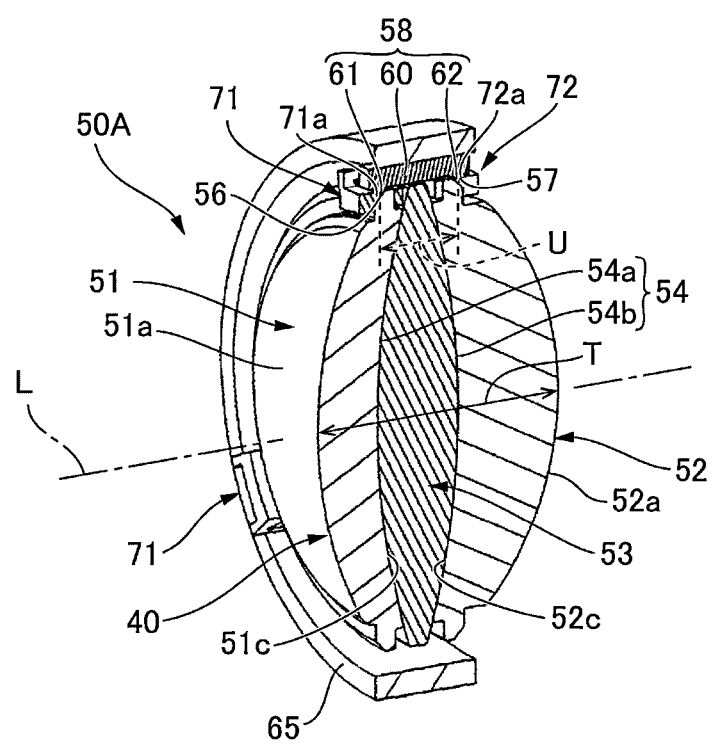
FIG. 5 is a perspective view of the lens unit shown in FIG. 4 when being cut along the line B-B.

FIG. 4 is a perspective view of a lens unit according to Practical Example 2. FIG. 5 is a perspective view of the lens unit shown in FIG. 4 when being cut along the line B-B.

Figure 6:
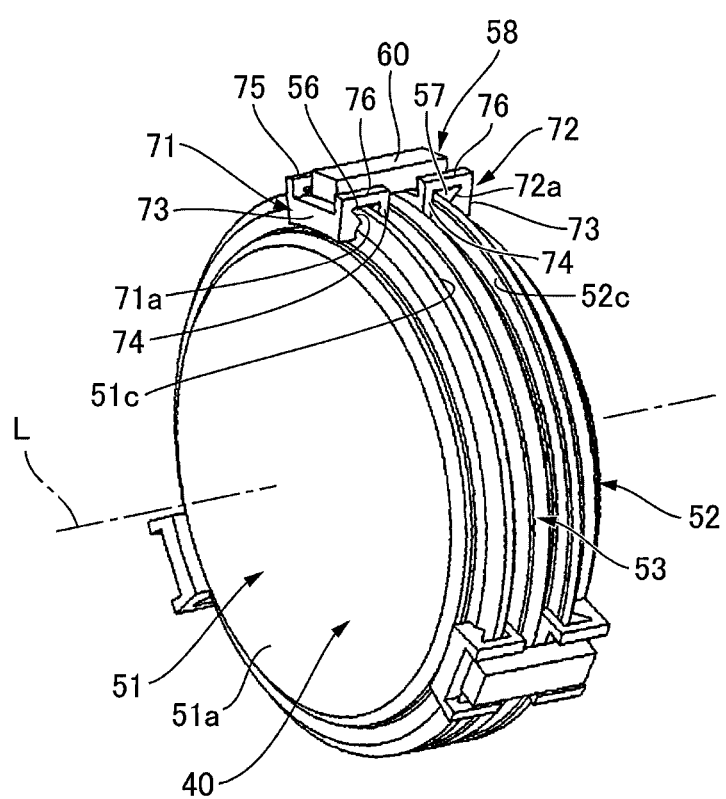
FIG. 6 is a perspective view of the lens unit shown in FIG. 4 when a holding ring is removed from the lens unit.
Figure 7:
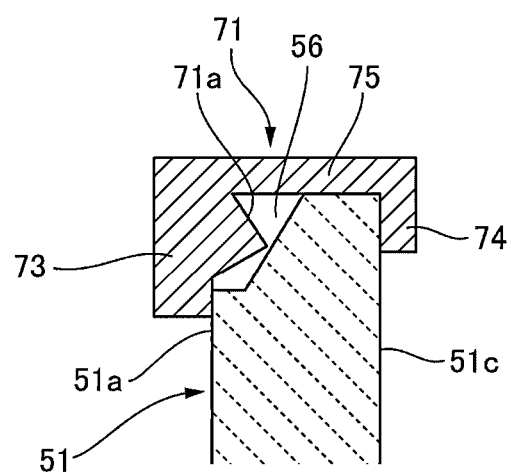
FIG. 7 is an explanatory diagram of a first fixation member fixed to a first lens.

FIG. 6 is a perspective view of the lens unit shown in FIG. 4 when the holding ring is removed from the lens unit. FIG. 7 is an explanatory diagram of a first fixation member 71 fixed to the first lens. The lens unit 50B according to the present example is provided with constituents corresponding to those of the lens unit 50A according to Practical Example 1. Therefore, the description will be presented denoting the corresponding constituents by the same reference numerals.

As shown in FIG. 4, the lens unit 50B according to Practical Example 2 has the jointed lens 40 and the holding mechanism 55. As shown in FIG. 5, as optical members, the jointed lens 40 is provided with a first lens 51, a second lens 52 arranged on the optical axis L of the first lens 51, and a third lens 53 disposed between the first lens 51 and the second lens 52. Further, the jointed lens 40 is provided with the first jointing member 54a and the second jointing member 54b, wherein the first jointing member 54a is located between the first lens 51 and the third lens 53, and adheres to the first lens 51 and the third lens 53, and the second jointing member 54b is located between the third lens 53 and the second lens 52, and adheres to the third lens 53 and the second lens 52. The first jointing member 54a and the second jointing member 54b have a light transmissive property. The first jointing member 54a and the second jointing member 54b are elastically deformable. In the present example, the jointing member 54 is an adhesive.

The holding mechanism 55 holds the first lens 51 and the second lens 52. The holding mechanism 55 keeps the distance between the first-lens lateral surface 51a at the opposite side to the second lens 52 in the first lens 51 and the second-lens lateral surface 52a at the opposite side to the first lens 51 in the second lens 52 in the preset distance T set in advance. As shown in FIG. 5 and FIG. 6, the holding mechanism 55 is provided with first fixation members 71 to be fixed to the outer circumferential edge of the first lens 51, second fixation members 72 to be fixed to the outer circumferential edge of the second lens 52, and the inter-surface distance keeping members 58 each disposed at the outer side in the radial direction of the first fixation member 71 and the second fixation member 72. The first fixation members 71 and the second fixation members 72 are each disposed at three places around the optical axis L at regular angular intervals. The first fixation members 71 and the second fixation members 72 respectively overlap each other when viewed from the optical axis L direction. Further, the holding mechanism 55 is provided with three inter-surface distance keeping members 58 as the inter-surface distance keeping members 58. The three inter-surface distance keeping members 58 are each disposed at the outer side in the radial direction of the first fixation member 71 and the second fixation member 72. In the present example, the first fixation members 71 and the second fixation members 72 are made of metal.

As shown in FIG. 6, the first fixation member 71 is provided with a first facing surface 71a opposed to an outer circumferential edge part of the first-lens lateral surface 51a in the optical axis L direction. The second fixation member 72 is provided with a second facing surface 72a opposed to an outer circumferential edge part of the second-lens lateral surface 52a in the optical axis L direction. More specifically, as shown in FIG. 7, the first fixation member 71 is provided with a first contact part 73 making contact with the first-lens lateral surface 51a from the optical axis L direction, a second contact part 74 making contact with the outer circumferential edge part of a first-lens medial surface 51c at the second lens 52 side in the first lens 51 from the optical axis L direction, and a first coupling part 75 and a second coupling part 76 for coupling the first contact part 73 and the second contact part 74 to each other at two places in the circumferential direction. The first facing surface 71a is provided to the first contact part 73. The first facing surface 71a is a taper surface tilted in a direction of getting away from the outer circumferential edge part of the outer circumferential surface of the first lens 51 from the inner circumferential side toward the outer circumferential side. Between the first facing surface 71a and the outer circumferential edge part of the first-lens lateral surface 51a in the optical axis L direction, there is disposed the first recessed part 56 recessed toward the inner side in the radial direction. The first recessed part 56 is disposed outside the effective ray range of the first lens 51. The first recessed part 56 is the latched part to be engaged with the inter-surface distance keeping member 58.

The first fixation member 71 and the second fixation member 72 are members the same as each other. The second fixation member 72 is fixed to the second lens 52 with the posture flipped in the optical axis L direction from that of the first fixation member 71. Therefore, as shown in FIG. 6, the second fixation member 72 is provided with the first contact part 73 making contact with the second-lens lateral surface 52a from the optical axis L direction, the second contact part 74 making contact with the outer circumferential edge part of a second-lens medial surface 52c at the first lens 51 side in the second lens 52 from the optical axis L direction, and the first coupling part 75 and the second coupling part 76 for coupling the first contact part 73 and the second contact part 74 to each other at two places in the circumferential direction. The second facing surface 72a is provided to the second contact part 74. The second facing surface 72a is a taper surface tilted in a direction of getting away from the outer circumferential edge part of the second-lens lateral surface 52a from the inner circumferential side toward the outer circumferential side. Between the second facing surface 72a and the outer circumferential edge part of the second-lens lateral surface 52a in the optical axis L direction, there is disposed the second recessed part 57 recessed toward the inner side in the radial direction. The second recessed part 57 is disposed outside the effective ray range of the second lens 52. The second recessed part 57 is the latched part to be engaged with the inter-surface distance keeping member 58.

As shown in FIG. 5, the inter-surface distance keeping members 58 are each provided with the main body part 60 extending in the optical axis L direction, the first protrusion 61 protruding toward the inner side in the radial direction from the main body part 60, and the second protrusion 62 protruding toward the inner side in the radial direction at a position distant as much as the predetermined distance U from the first protrusion 61 in the optical axis L direction. The main body part 60 is disposed between the first coupling part 75 and the second coupling part 76 in the first fixation member 71, and between the first coupling part 75 and the second coupling part 76 in the second fixation member 72. The first protrusion 61 is fitted into the first recessed part 56 of the first lens 51 from the outer side in the radial direction. The second protrusion 62 is fitted into the second recessed part 57 of the second lens 52 from the outer side in the radial direction. In other words, the first protrusion 61 is a first latch part to be engaged with the first recessed part 56, and the second protrusion 62 is a second latch part to be fitted into the second recessed part 57. In the present example, the inter-surface distance keeping members 58 are made of metal.

Further, the lens unit 50B is provided with the holding ring 65 for holding the three inter-surface distance keeping members 58 from the outer circumferential side. The holding ring 65 makes contact with each of the inter-surface distance keeping members 58 from the outer circumferential side.

According to the present example, by fixing the first fixation member 71 to the first lens 51, the first recessed part 56 recessed toward the inner side in the radial direction is disposed between the first fixation member 71 and the first lens 51. Further, by fixing the second fixation member 72 to the second lens 52, the second recessed part 57 recessed toward the inner side in the radial direction is disposed between the second fixation member 72 and the second lens 52. Further, the first protrusion 61 of the inter-surface distance keeping member 58 is fitted into the first recessed part 56 from the outer side in the radial direction, and the second protrusion 62 distant as much as the predetermined distance U from the first protrusion 61 in the optical axis L direction is fitted into the second recessed part 57 from the outer side in the radial direction. Thus, since the positions of the first lens 51 and the second lens 52 in the optical axis L direction can be defined, the distance between the first-lens lateral surface 51a of the first lens 51 and the second-lens lateral surface 52a of the second lens 52 can be kept in the preset distance T set in advance.

Further, the first jointing member 54a and the second jointing member 54b are elastically deformable. Therefore, when the distance between the first lens 51 and the second lens 52 changes for setting the distance between the first lens 51 and the second lens 52 to the preset distance T, the first jointing member 54a changes in the thickness along the optical axis L to keep the state of adhering to the first lens 51 and the third lens 53. Further, the second jointing member 54b also changes in the thickness along the optical axis L to keep the state of adhering to the third lens 53 and the second lens 52.

Lens Unit According to Practical Example 3

Figure 8:
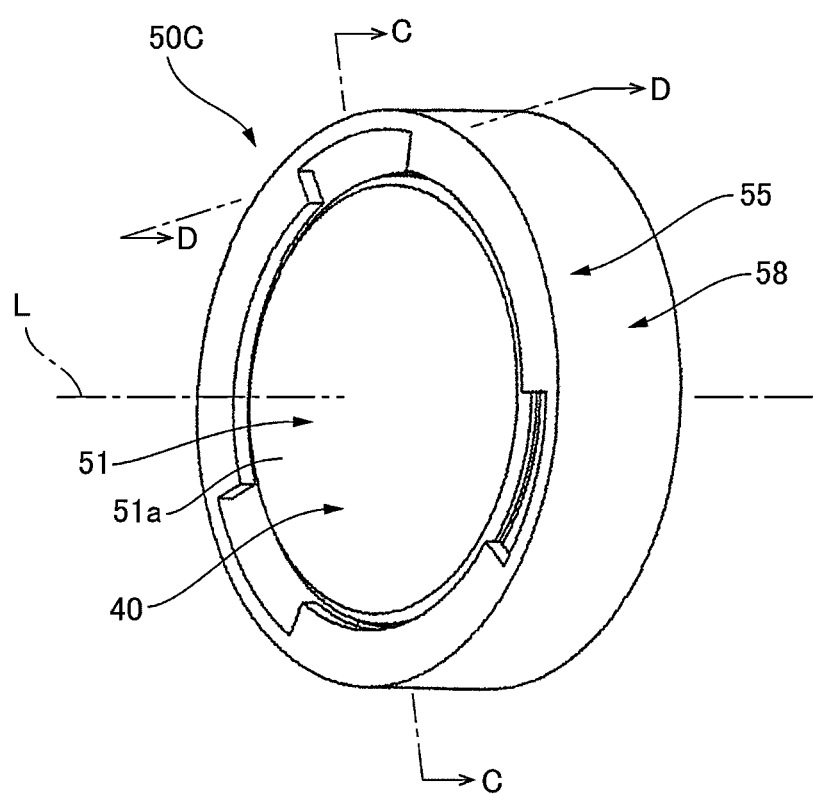
FIG. 8 is a perspective view of a lens unit according to Practical Example 3.
Figure 9:
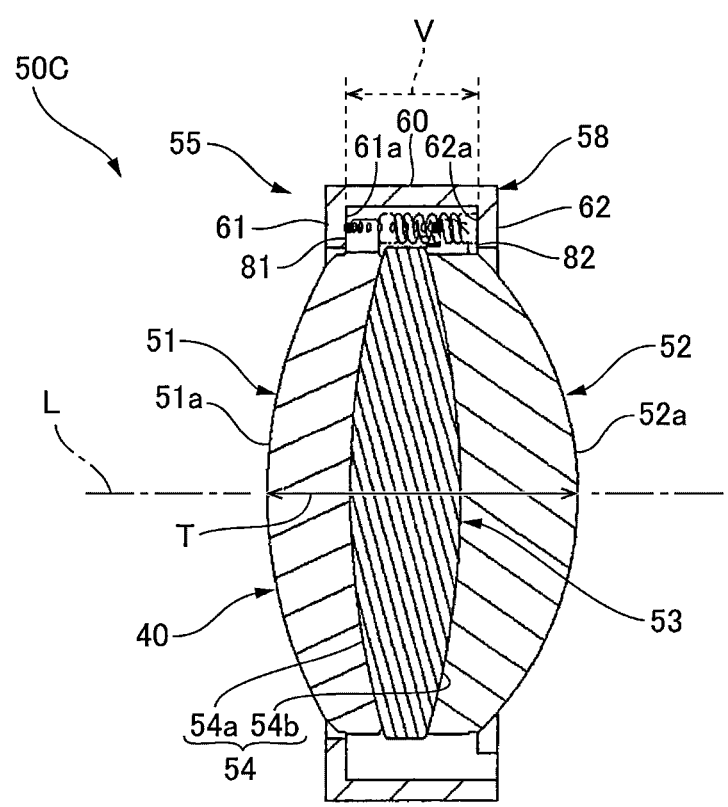
FIG. 9 is a cross-sectional view of the lens unit shown in FIG. 8 when being cut along the line C-C.
Figure 10:
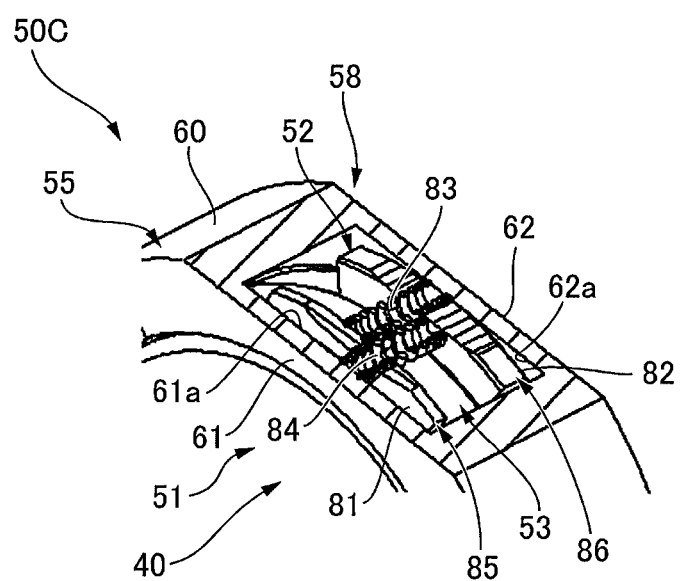
FIG. 10 is a partial perspective view of the lens unit shown in FIG. 8 when being cut along the line D-D.
Figure 11:
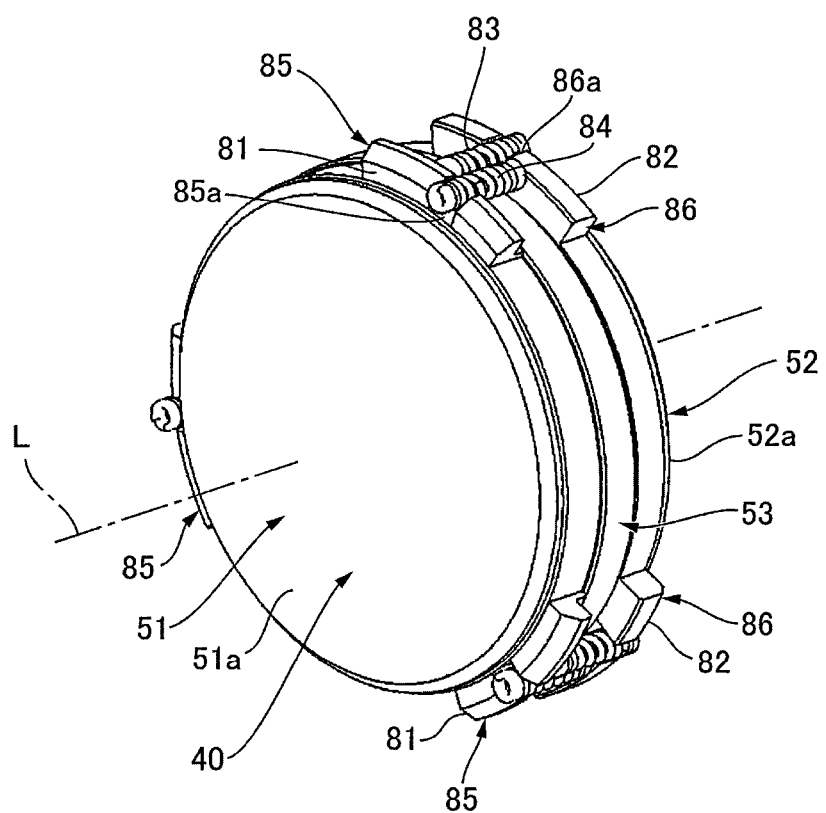
FIG. 11 is a perspective view of the lens unit in the state in which a holding ring shown in FIG. 8 is detached.

FIG. 8 is a perspective view of a lens unit according to Practical Example 3. FIG. 9 is a cross-sectional view of the lens unit shown in FIG. 8 when being cut along the line C-C. FIG. 10 is a cross-sectional view of the lens unit shown in FIG. 8 when being cut along the line D-D. FIG. 11 is a perspective view of the lens unit in the state in which a holding ring is detached. It should be noted that since the lens unit 50C according to Practical Example 3 is provided with constituents corresponding to those of the lens unit 50A according to Practical Example 1, the corresponding constituents are denoted by the same reference symbols.

As shown in FIG. 8, the lens unit 50C according to Practical Example 3 has the jointed lens 40 and the holding mechanism 55. As shown in FIG. 9, as optical members, the jointed lens 40 is provided with the first lens 51, the second lens 52 arranged on the optical axis L of the first lens 51, and the third lens 53 disposed between the first lens 51 and the second lens 52. Further, the jointed lens 40 is provided with the first jointing member 54a and the second jointing member 54b, wherein the first jointing member 54a is located between the first lens 51 and the third lens 53, and adheres to the first lens 51 and the third lens 53, and the second jointing member 54b is located between the third lens 53 and the second lens 52, and adheres to the third lens 53 and the second lens 52. The first jointing member 54a and the second jointing member 54b have a light transmissive property. Further, the first jointing member 54a and the second jointing member 54b are elastically deformable. In the present example, the jointing member 54 is an adhesive.

The holding mechanism 55 holds the first lens 51 and the second lens 52. The holding mechanism 55 keeps the distance between the first-lens lateral surface 51a at the opposite side to the second lens 52 in the first lens 51 and the second-lens lateral surface 52a at the opposite side to the first lens 51 in the second lens 52 in the preset distance T set in advance. The adjustment mechanism 55 is provided with first reference surfaces 81 disposed by the outer circumferential side of the effective ray range of the first-lens lateral surface 51a, and second reference surfaces 82 disposed by the outer circumferential side of the effective ray range of the second-lens lateral surface 52a. Further, the holding mechanism 55 is provided with the inter-surface distance keeping members 58 disposed at the outer side in the radial direction of the first lens 51 and the second lens 52, first pressing members 83 for pressing the first lens 51, and second pressing members 84 for pressing the second lens 52.

The first reference surfaces 81 are disposed at three places around the optical axis L in the first lens 51. The second reference surfaces 82 are disposed at three places around the optical axis L in the second lens 52. In the present example, the three first reference surfaces 81 and the three second reference surfaces 82 are each disposed at regular angular intervals. The first reference surfaces 81 and the second reference surfaces 82 are located at the same angular positions around the optical axis L, respectively. More specifically, as shown in FIG. 11, the first lens 51 is provided with first protruding parts 85 protruding outward in the radial direction at three places at regular angular intervals around the optical axis L. The surface at an opposite side to the second lens 52 of each of the first protruding parts 85 corresponds to the first reference surface 81 perpendicular to the optical axis L. The second lens 52 is provided with second protruding parts 86 protruding outward in the radial direction at three places at regular angular intervals around the optical axis L. When viewed from the optical axis L direction, the first protruding parts 85 and the second protruding parts 86 overlap each other. The surface at an opposite side to the first lens 51 of each of the second protruding parts 86 corresponds to the second reference surface 82 perpendicular to the optical axis L.

Here, the first protruding parts 85 and the first reference surfaces 81 can be formed using a metal mold when molding the first lens 51. It should be noted that it is possible to form the first reference surfaces 81 without providing the first protruding parts 85 to the first lens 51. In this case, the first reference surfaces 81 can be formed by cutting work outside the effective ray range of the first lens 51. Similarly, the second protruding parts 86 and the second reference surfaces 82 can be formed using a metal mold when molding the second lens 52. It should be noted that it is possible to form the second reference surfaces 82 without providing the second protruding parts 86 to the second lens 52. In this case, the second reference surfaces 82 can be formed by cutting work outside the effective ray range of the second lens 52.

The inter-surface distance keeping members 58 are each a ring-like member. As shown in FIG. 9 and FIG. 10, the inter-surface distance keeping members 58 are each provided with the main body part 60 surrounding the first lens 51 and the second lens 52 from the outer side in the radial direction, the first protrusion 61 which has a ring-like shape and protrudes toward the inner side in the radial direction from an end portion at one side in the optical axis L direction of the main body part 60, and the second protrusion 62 which has a ring-like shape and protrudes toward the inner side in the radial direction from an end portion at the other side in the optical axis L direction of the main body part 60. The first protrusion 61 is provided with a first positioning surface 61a which can make contact with the first reference surface 81 of the first lens 51 from the optical axis L direction. The second protrusion 62 is provided with a second positioning surface 62a which can make contact with the second reference surface 82 of the second lens 52 from the optical axis L direction. The second positioning surface 62a is distant as much as a predetermined distance V from the first positioning surface 61a in the optical axis L direction. The inter-surface distance keeping members 58 can be formed of metal.

Further, as shown in FIG. 10 and FIG. 11, the holding mechanism 55 is provided with the first pressing members 83 for pressing the first lens 51 toward the optical axis L direction, and the second pressing members 84 for pressing the second lens 52 toward the optical axis L direction. The first pressing members 83 and the second pressing members 84 are each disposed at three places around the optical axis L. The first pressing members 83 are each a coil spring, and are each disposed between the second protrusion 62 of the inter-surface distance keeping member 58 and the first protruding part 85 of the first lens 51 to bias the first lens 51 toward the first positioning surface 61a. Thus, the first reference surface 81 makes contact with the first positioning surface 61a. The second pressing members 84 are each a coil spring, and are each disposed between the first protrusion 61 of the inter-surface distance keeping member 58 and the second protruding part 86 of the second lens 52 to bias the second lens 52 toward the second positioning surface 62a. Thus, the second reference surface 82 makes contact with the second positioning surface 62a. It should be noted that as the first pressing members 83 and the second pressing members 84, it is possible to use an elastic member such as rubber.

As shown in FIG. 11, each of the first protruding parts 85 of the first lens 51 is provided with a first groove 85a for disposing the second pressing member 84 between the first protrusion 61 and the second protruding part 86 of the second lens 52. The first groove 85a penetrates the first protruding part 85 in the optical axis L direction. Further, each of the second protruding parts 86 of the second lens 52 is provided with a second groove 86a for disposing the first pressing member 83 between the second protrusion 62 and the first protruding part 85 of the first lens 51. The second groove 86a penetrates the second protruding part 86 in the optical axis L direction.

The inter-surface distance keeping members 58 are each provided with the first positioning surface 61a which can make contact with the first reference surface 81 of the first lens 51 from the optical axis L direction. Further, the inter-surface distance keeping members 58 are each provided with the second positioning surface 62a which can make contact with the second reference surface 82 of the second lens 52 from the optical axis L direction at a position distant as much as the predetermined distance V from the first positioning surface 61a in the optical axis L direction. Further, the holding mechanism 55 is provided with the first pressing members 83 for pressing the first lens 51 toward the first positioning surfaces 61a to make the first reference surfaces 81 make contact with the first positioning surfaces 61a, and the second pressing members 84 for pressing the second lens 52 toward the second positioning surfaces 62a to make the second reference surfaces 82 make contact with the second positioning surfaces 62a. Thus, since the positions of the first lens 51 and the second lens 52 in the optical axis L direction can be defined, the distance between the first-lens lateral surface 51a of the first lens 51 and the second-lens lateral surface 52a of the second lens 52 can be kept in the preset distance T set in advance.

Further, the first jointing member 54a and the second jointing member 54b are elastically deformable. Therefore, when the distance between the first lens 51 and the second lens 52 changes for setting the distance between the first lens 51 and the second lens 52 to the preset distance T, the first jointing member 54a changes in the thickness along the optical axis L to keep the state of adhering to the first lens 51 and the third lens 53. Further, the second jointing member 54b also changes in the thickness along the optical axis L to keep the state of adhering to the third lens 53 and the second lens 52.

Modified Example of Lens Unit

It should be noted that in the lens units 50A through 50C, it is possible to assume that the jointed lens 40 has two lenses, namely the first lens 51 and the second lens 52. In this case, the first lens 51 and the second lens 52 are bonded to each other with the jointing member 54 provided with a light transmissive property. The jointing member 54 is elastically deformable. The jointing member 54 adheres to the first lens 51 and the second lens 52 located before and after the jointing member 54 in the optical axis L direction.

Also in such a manner, when the lens unit is provided with the holding mechanism 55, it is possible to define the positions of the first lens 51 and the second lens 52 in the optical axis L direction. Therefore, the distance between the first-lens lateral surface 51a at the opposite side to the second lens 52 in the first lens 51 and the second-lens lateral surface 52a at the opposite side to the first lens 51 in the second lens 52 can be kept in the preset distance T set in advance. The jointing member 54 is elastically deformable. Therefore, when the distance between the first lens 51 and the second lens 52 changes for setting the distance between the first lens 51 and the second lens 52 to the preset distance T, the jointing member 54 changes in the thickness along the optical axis L to keep the state of adhering to the first lens 51 and the second lens 52.

Projector

Figure 12:
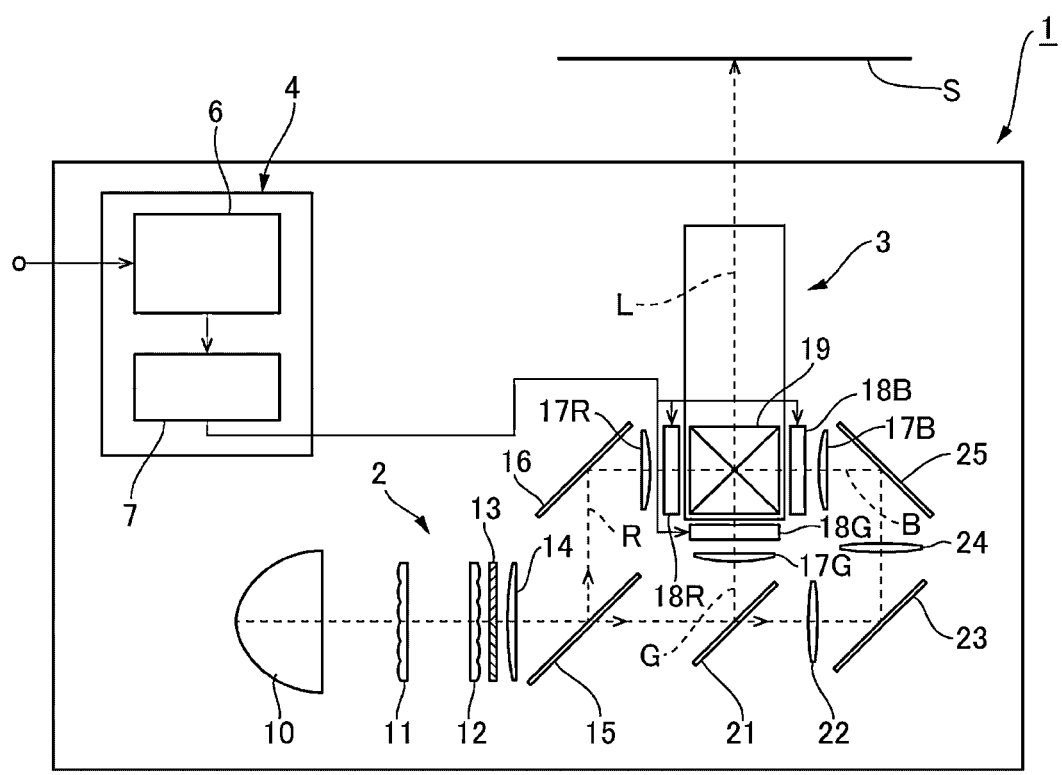
FIG. 12 is a schematic configuration diagram of a projector equipped with a projection optical system.

FIG. 12 is a schematic configuration diagram of a projector equipped with the projection optical system 3 according to the present disclosure. As shown in FIG. 12, the projector 1 is provided with an image formation section 2 for generating a projection image to be projected on a screen S, the projection optical system 3 for enlarging the projection image to project the enlarged image on the screen S, and a control section 4 for controlling an operation of the image formation section 2.

Image Generation Optical System and Control Section

The image formation section 2 is provided with a light source 10, a first integrator lens 11, a second integrator lens 12, a polarization conversion element 13, and a superimposing lens 14. The light source 10 is formed of, for example, a super-high pressure mercury lamp or a solid-state light source. The first integrator lens 11 and the second integrator lens 12 each have a plurality of lens elements arranged in an array. The first integrator lens 11 divides a light beam from the light source 10 into a plurality of light beams. Each of the lens elements of the first integrator lens 11 converges the light beam from the light source 10 in the vicinity of the corresponding one of the lens elements of the second integrator lens 12.

The polarization conversion element 13 converts the light from the second integrator lens 12 into predetermined linearly polarized light. The superimposing lens 14 superimposes the images of the respective lens elements of the first integrator lens 11 on the display area of each of a liquid crystal panel 18R, a liquid crystal panel 18G, and a liquid crystal panel 18B described later via the second integrator lens 12.

Further, the image formation section 2 is provided with a first dichroic mirror 15, a reflecting mirror 16 and a field lens 17R, and the liquid crystal panel 18R. The first dichroic mirror 15 reflects R light as a part of the light beam having entered the first dichroic mirror 15 from the superimposing lens 14, and transmits G light and B light each of which is a part of the light beam having entered the first dichroic mirror 15 from the superimposing lens 14. The R light having been reflected by the first dichroic mirror 15 enters the liquid crystal panel 18R via the reflecting mirror 16 and the field lens 17R. The liquid crystal panel 18R is a light modulator. The liquid crystal panel 18R modulates the R light in accordance with an image signal to thereby form a red projection image.

Further, the image formation section 2 is provided with a second dichroic mirror 21, a field lens 17G, and the liquid crystal panel 18G. The second dichroic mirror 21 reflects the G light as a part of the light beam from the first dichroic mirror 15, and transmits the B light as a part of the light beam from the first dichroic mirror 15. The G light having been reflected by the second dichroic mirror 21 enters the liquid crystal panel 18G via the field lens 17G. The liquid crystal panel 18G is a light modulator. The liquid crystal panel 18G modulates the G light in accordance with the image signal to thereby form a green projection image.

Further, the image formation section 2 is provided with a relay lens 22, a reflecting mirror 23, a relay lens 24, a reflecting mirror 25 and a field lens 17B, and the liquid crystal panel 18B. The B light having been transmitted through the second dichroic mirror 21 enters the liquid crystal panel 18B via the relay lens 22, the reflecting mirror 23, the relay lens 24, the reflecting mirror 25, and the field lens 17B. The liquid crystal panel 18B is a light modulator. The liquid crystal panel 18B modulates the B light in accordance with the image signal to thereby form a blue projection image.

The liquid crystal panel 18R, the liquid crystal panel 18G, and the liquid crystal panel 18B surround a cross dichroic prism 19 from three directions. The cross dichroic prism 19 is a light combining prism, and generates the projection image obtained by combining the light beams modulated by the respective liquid crystal panels 18R, 18G, and 18B with each other.

Here, the cross dichroic prism 19 constitutes apart of the projection optical system 3. The projection optical system 3 projects the projection image (the images formed by the respective liquid crystal panels 18R, 18G, and 18B) combined by the cross dichroic prism 19 on the screen S in an enlarged manner. The screen S is an elargement-side imaging plane of the projection optical system 3.

The control section 4 is provided with an image processing section 6 to which an external image signal such as a video signal is input, and a display drive section 7 for driving the liquid crystal panel 18R, the liquid crystal panel 18G, and the liquid crystal panel 18B based on the image signals output from the image processing section 6.

The image processing section 6 converts the image signal input from external equipment into image signals including the tones and so on of the respective colors. The display drive section 7 operates the liquid crystal panel 18R, the liquid crystal panel 18G, and the liquid crystal panel 18B based on the projection image signals of the respective colors output from the image processing section 6. Thus, the image processing section 6 displays the projection images corresponding to the image signals on the liquid crystal panel 18R, the liquid crystal panel 18G, and the liquid crystal panel 18B, respectively.

Projection Optical System

Then, the projection optical system 3 will be described. Practical Example 1 through Practical Example 3 will hereinafter be described as configuration examples of the projection optical system 3 to be implemented in the projector 1. It should be noted that in each of Practical Example 1 through Practical Example 3, the liquid crystal panel 18R, the liquid crystal panel 18G, and the liquid crystal panel 18B are described as the liquid crystal panel 18 in the ray chart of the projection optical system. Further, each of Practical Example 1 through Practical Example 3 is provided with the lens unit 50. The lens unit 50 is what is obtained by jointing the two or three lenses to each other with the jointing member 54 elastically deformable. In the lens unit 50, the jointing member 54 is an adhesive. Further, the lens unit 50 is provided with any one of the holding mechanisms 55 described in the lens units 50A through 50C described above.

Projection Optical System According to Practical Example 4

Figure 13:
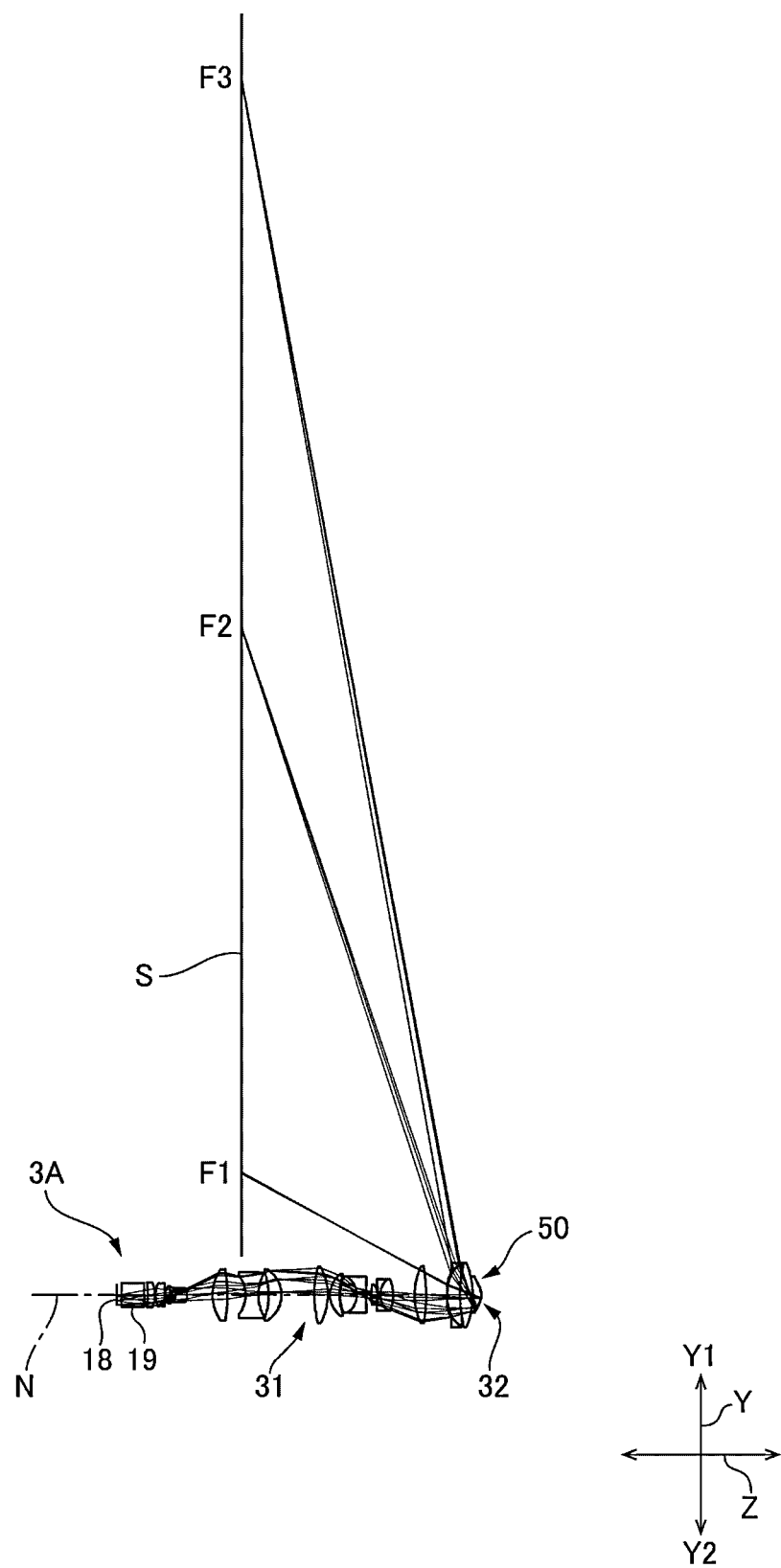
FIG. 13 is a ray chart schematically showing a whole of a projection optical system according to Practical Example 4.
Figure 14:
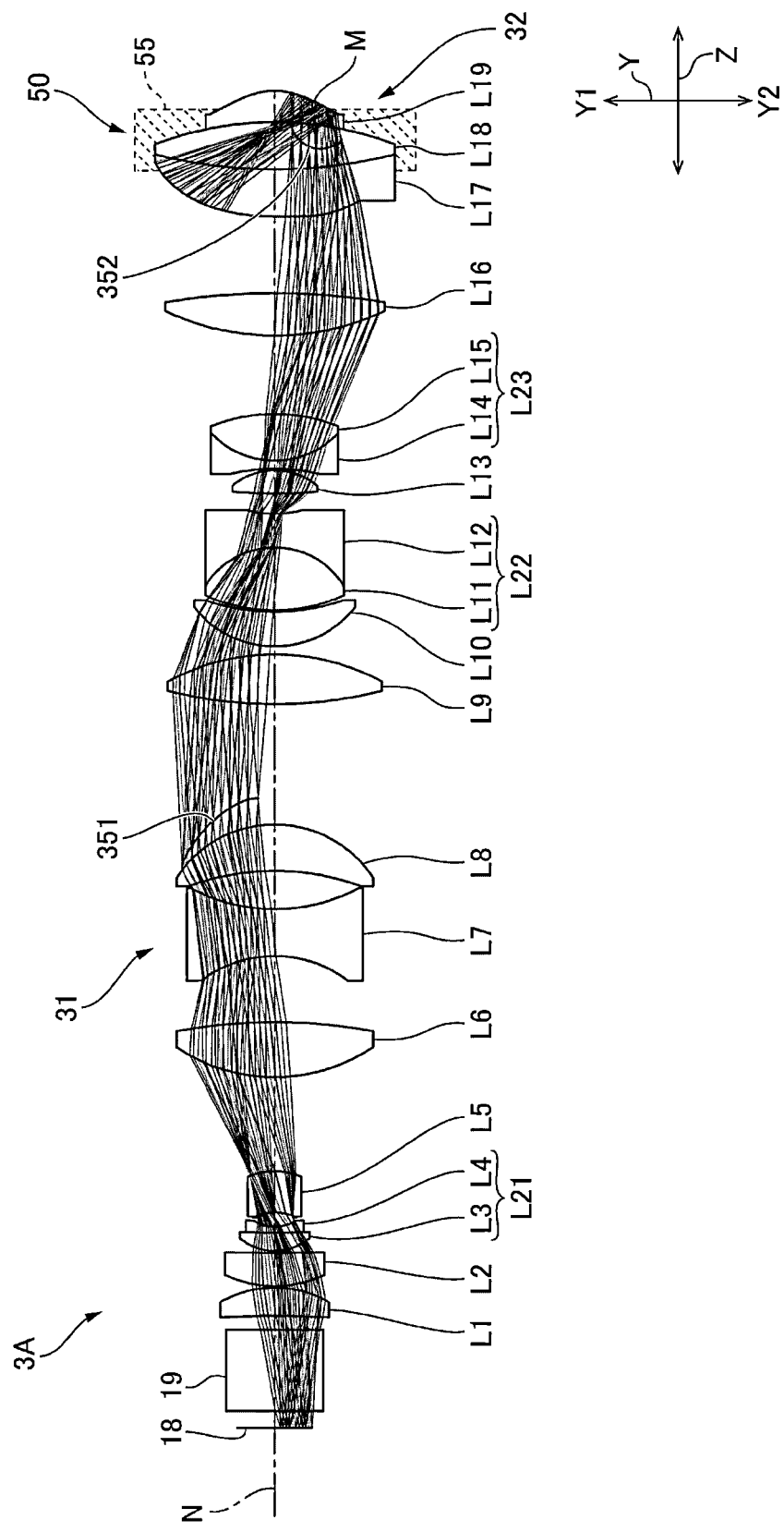
FIG. 14 is a ray chart of the projection optical system according to Practical Example 4.
Figure 15:
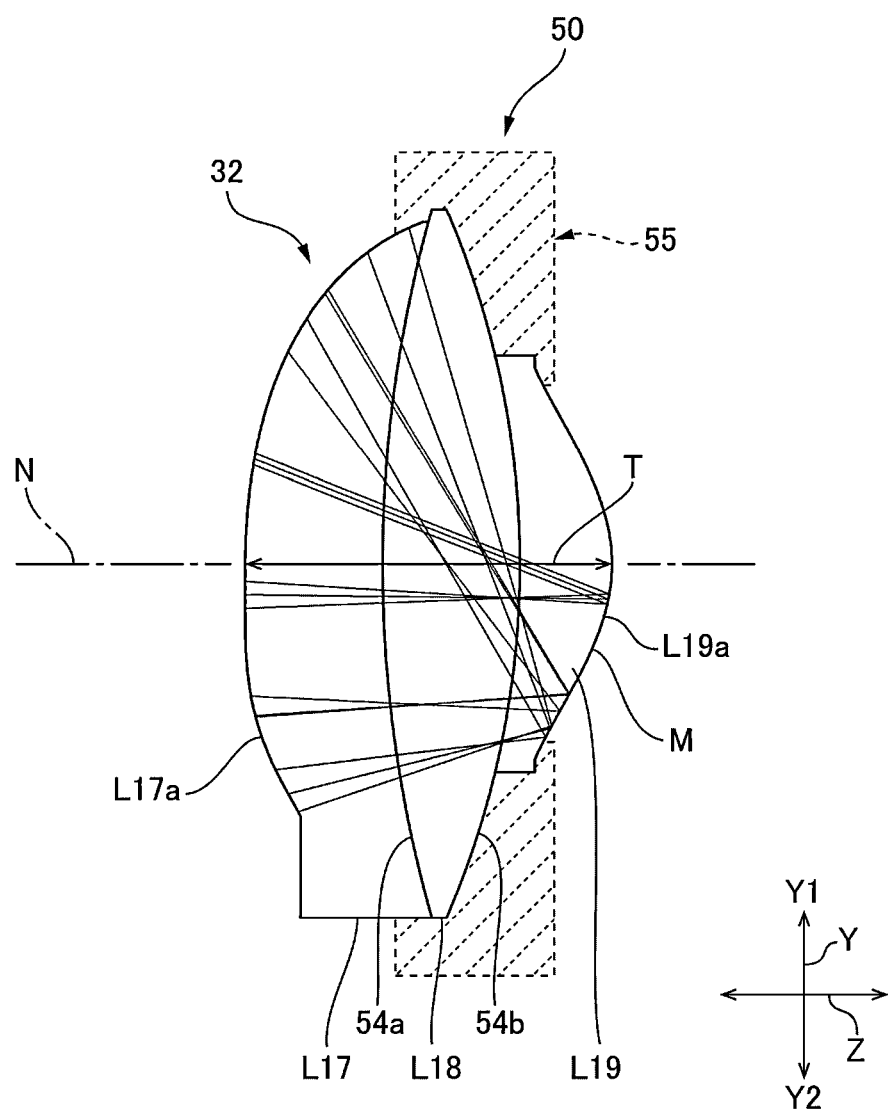
FIG. 15 is a ray chart of a second optical system in Practical Example 4.

FIG. 13 is a ray chart schematically showing a whole of a projection optical system according to Practical Example 4. FIG. 13 schematically shows the light beams which reach the screen S from the projection optical system 3A according to the present example with the light beams F1 through F3. The light beam F1 is a light beam which reaches the position where the image height is the lowest. The light beam F3 is a light beam which reaches the position where the image height is the highest. The light beam F2 is a light beam which reaches a position between the positions of the light beam F1 and the light beam F3. FIG. 14 is a ray chart of the projection optical system 3A according to Practical Example 4. FIG. 15 is a ray chart of a second optical system in the projection optical system 3A.

As shown in FIG. 14, the projection optical system 3A according to the present example is constituted by a first optical system 31 and a second optical system 32 arranged in sequence from the reduction-side toward the elargement-side. The first optical system 31 is a refracting optical system provided with a plurality of lenses. The second optical system 32 is the lens unit 50 having three lenses bonded to each other. The second optical system 32 has a mirror M provided with a concavely curved surface. The projection optical system 3A forms a first intermediate image 351 conjugate with a reduction-side imaging plane in the middle of the first optical system 31. Further, the projection optical system 3A forms a second intermediate image 352 conjugate with the reduction-side imaging plane in the middle of the second optical system 32. Further, the projection optical system 3A forms a final image conjugate with the second intermediate image 352 on the elargement-side imaging plane.

By the reduction-side imaging plane, there is disposed the liquid crystal panel 18 of the image formation section 2. The liquid crystal panel 18 forms the projection image at the other side of the optical axis N of the first optical system 31. The first intermediate image 351 is formed at one side of the optical axis N of the first optical system 31. The second intermediate image 352 is formed at the other side of the optical axis N of the first optical system 31. The elargement-side imaging plane is disposed at one side of the optical axis N of the first optical system 31. In the elargement-side imaging plane, there is disposed the screen S.

In the following description, three axes perpendicular to each other are defined as an X axis, a Y axis, and a Z axis for the sake of convenience. Further, it is assumed that the optical axis direction along the optical axis N of the first optical system 31 is the Z-axis direction, one side of the optical axis N is an upper side Y1 in the Y-axis direction, and the other side is a lower side Y2 in the Y-axis direction. It is assumed that a plane which is perpendicular to the X axis and includes the Y axis and the Z axis is a Y-Z plane. Therefore, the liquid crystal panel 18 forms the projection image in the lower side Y2 of the optical axis N. The first intermediate image 351 is formed in the upper side Y1 of the optical axis N. The second intermediate image 352 is formed in the lower side Y2 of the optical axis N. The screen S is located in the upper side Y1 of the optical axis N. The lateral direction of the screen S corresponds to the X-axis direction. The second intermediate image 352 is an image vertically flipped in the Y-axis direction with respect to the enlarged image to be formed in the screen S. FIG. 13, FIG. 14, and FIG. 15 are each a ray chart in the Y-Z plane.

As shown in FIG. 14, the first optical system 31 has the cross dichroic prism 19, and sixteen lenses L1 through L16. The first lens L1 through the 16-th lens L16 are arranged in this order from the reduction side toward the elargement side. In the present example, the third lens L3 and the fourth lens L4 are bonded to each other to form a first jointed lens L21. The 11-th lens L11 and the 12-th lens L12 are bonded to each other to form a second jointed lens L22. The 14-th lens L14 and the 15-th lens L15 are bonded to each other to form a third jointed lens L23.

As shown in FIG. 15, the second optical system 32 is constituted by a 17-th lens L17, an 18-th lens L18, and a 19-th lens L19. The first jointing member 54a intervenes between the 17-th lens and the 18-th lens, and the second jointing member 54b intervenes between the 18-th lens and the 19-th lens. By an outer side in the redial direction of the 17-th lens L17, the 18-th lens L18, and the 19-th lens L19, there is disposed the holding mechanism 55 for keeping the distance between a 17-th-lens lateral surface L17a at an opposite side to the 19-th lens L19 in the 17-th lens L17 and a 19-th-lens lateral surface L19a at an opposite side to the 17-th lens L17 in the 19-th lens L19 in the preset distance T set in advance. Further, the second optical system 32 has the mirror M provided with the concavely curved surface. The mirror M is a reflective coating layer provided to the 19-th-lens lateral surface L19a. The mirror M reflects the ray from the first optical system 31 toward the upper side Y1.

Lens Data

The lens data of the projection optical system 3A is as follows. The surface numbers are provided in sequence from the reduction side toward the elargement side. The reference symbols are the reference symbols of the lenses and the mirrors. The data of the surface numbers not corresponding to any lenses or any mirrors are dummy data. The reference symbol R represents a curvature radius. The reference symbol D represents an axial surface distance. The reference symbol A represents an effective diameter. The units of R, D, and A are millimeter.

| REFERENCE SYMBOL | SURFACE NUMBER | SHAPE | R | D | GLASS MATERIAL | REFRACTION/ REFLECTION | A |
|---|---|---|---|---|---|---|---|
| | 0 | SPHERE | INFINITE | 5.3900 | | REFRACTION | 0.0000 |
| | 1 | SPHERE | INFINITE | 25.9100 | BSC7 | REFRACTION | 11.9263 |
| 19 | 2 | SPHERE | INFINITE | 4.0000 | | REFRACTION | 13.9142 |
| | 3 | SPHERE | INFINITE | 0.3397 | | REFRACTION | 14.8696 |
| L1 | 4 | SPHERE | −328.1403 | 8.9875 | TAFD5F | REFRACTION | 14.8702 |
| | 5 | SPHERE | −32.9236 | 0.5000 | | REFRACTION | 15.6675 |
| L2 | 6 | SPHERE | 35.2778 | 10.6178 | TAF1 | REFRACTION | 14.2863 |
| | 7 | SPHERE | 2158.7790 | 0.5956 | | REFRACTION | 12.0454 |
| L3 | 8 | SPHERE | 16.4198 | 5.7747 | FCD515 | REFRACTION | 9.8503 |
| L4 | 9 | SPHERE | 158.3827 | 1.9851 | FD225 | REFRACTION | 8.1367 |
| | 10 | SPHERE | 12.3305 | 2.8995 | | REFRACTION | 6.2473 |
| | 11 | SPHERE | INFINITE | 1.6564 | | REFRACTION | 5.6369 |
| L5 | 12 | SPHERE | −14.2698 | 13.1316 | SFSL5 | REFRACTION | 5.6271 |
| | 13 | SPHERE | −20.3638 | 30.0346 | | REFRACTION | 7.5000 |
| L6 | 14 | SPHERE | 54.1315 | 17.4918 | SLAH89 | REFRACTION | 29.0000 |
| | 15 | SPHERE | −167.1383 | 21.0941 | | REFRACTION | 26.1025 |
| L7 | 16 | SPHERE | −37.2827 | 15.0000 | EC3 | REFRACTION | 22.4382 |
| | 17 | SPHERE | 54.5260 | 12.1913 | | REFRACTION | 25.8190 |
| L8 | 18 | SPHERE | −76.5126 | 14.7917 | TAFD33 | REFRACTION | 26.4354 |
| | 19 | SPHERE | −36.2470 | 38.4506 | | REFRACTION | 29.0033 |
| | 20 | SPHERE | INFINITE | 0.0000 | | REFRACTION | 31.6561 |
| L9 | 21 | SPHERE | 133.8789 | 15.8392 | SFSL5 | REFRACTION | 31.8487 |
| | 22 | SPHERE | −68.9741 | 2.5994 | | REFRACTION | 31.6470 |
| L10 | 23 | SPHERE | 31.3378 | 11.0553 | TAF1 | REFRACTION | 23.6500 |
| | 24 | SPHERE | 64.5697 | 0.5000 | | REFRACTION | 21.2712 |
| L11 | 25 | SPHERE | 52.2125 | 20.0000 | FCD100 | REFRACTION | 20.3631 |
| L12 | 26 | SPHERE | −25.0000 | 10.7786 | TAFD32 | REFRACTION | 11.6726 |
| | 27 | SPHERE | 32.9539 | 6.4395 | | REFRACTION | 7.8949 |
| L13 | 28 | SPHERE | 143.1217 | 7.4044 | FCD515 | REFRACTION | 10.7085 |
| | 29 | SPHERE | −20.0723 | 0.5000 | | REFRACTION | 12.1527 |
| L14 | 30 | SPHERE | −58.8944 | 2.6061 | FDS90SG | REFRACTION | 13.2638 |
| L15 | 31 | SPHERE | 26.6089 | 14.8509 | SLAH97 | REFRACTION | 16.1290 |
| | 32 | SPHERE | −52.1867 | 25.0657 | | REFRACTION | 18.4714 |
| L16 | 33 | SPHERE | 78.7767 | 13.4658 | SNBH57 | REFRACTION | 32.5354 |
| | 34 | SPHERE | −208.7929 | 5.0000 | | REFRACTION | 32.4274 |
| | 35 | SPHERE | INFINITE | 19.5666 | | REFRACTION | 30.9799 |
| L17 | 36 | ASPHERIC SURFACE | −369.8594 | 15.0386 | E48R_ZEON | REFRACTION | 26.5882 |
| L18 | 37 | SPHERE | 150.0000 | 15.0000 | SBAL12 | REFRACTION | 23.1486 |
| | 38 | SPHERE | −103.0000 | 10.0779 | E48R_ZEON | REFRACTION | 20.1205 |
| L19, M | 39 | ASPHERIC SURFACE | −18.5869 | −10.0779 | E48R_ZEON | REFLECTION | 20.2000 |

-continued

| REFERENCE SYMBOL | SURFACE NUMBER | SHAPE | R | D | GLASS MATERIAL | REFRACTION/ REFLECTION | A |
|---|---|---|---|---|---|---|---|
| L18 | 40 | SPHERE | −103.0000 | −15.0000 | SBAL12 | REFRACTION | 14.3544 |
| | 41 | SPHERE | 150.0000 | −15.0386 | E48R_ZEON | REFRACTION | 32.9333 |
| L17 | 42 | ASPHERIC SURFACE | 74.397 | −240.9501 | | REFRACTION | 37.4796 |
| | 43 | SPHERE | INFINITE | 0.0000 | | REFRACTION | 1450.6157 |

The aspherical coefficient of each of the aspheric surfaces is as follows.

| SURFACE NUMBER | 36 | 39 | 42 |
|---|---|---|---|
| Y CURVATURE RADIUS | −369.8593556 | −18.58690118 | 74.39788526 |
| CONIC CONSTANT (K) | 0 | −4.147826268 | 2.563567409 |
| 4-th-ORDER COEFFICIENT (A) | 2.37906E−05 | −1.85425E−05 | 1.00621E−06 |
| 6-th-ORDER COEFFICIENT (B) | −2.90682E−08 | 5.74483E−08 | 7.74934E−10 |
| 8-th-ORDER COEFFICIENT (C) | 2.72699E−11 | −7.17873E−11 | −7.32277E−13 |
| 10-th-ORDER COEFFICIENT (D) | −1.36402E−14 | 4.39201E−14 | 2.98841E−16 |

Functions and Advantages

Here, the lens unit 50 constituting the second optical system 22 is provided with the refracting surface and the reflecting surface, and the ray is folded at these surfaces. Therefore, when the thickness of the lens unit 50 changes from the design value, there is a problem that the direction of the ray passing through the lens unit 50 varies to increase the TV distortion in the final image.

Figure 16:
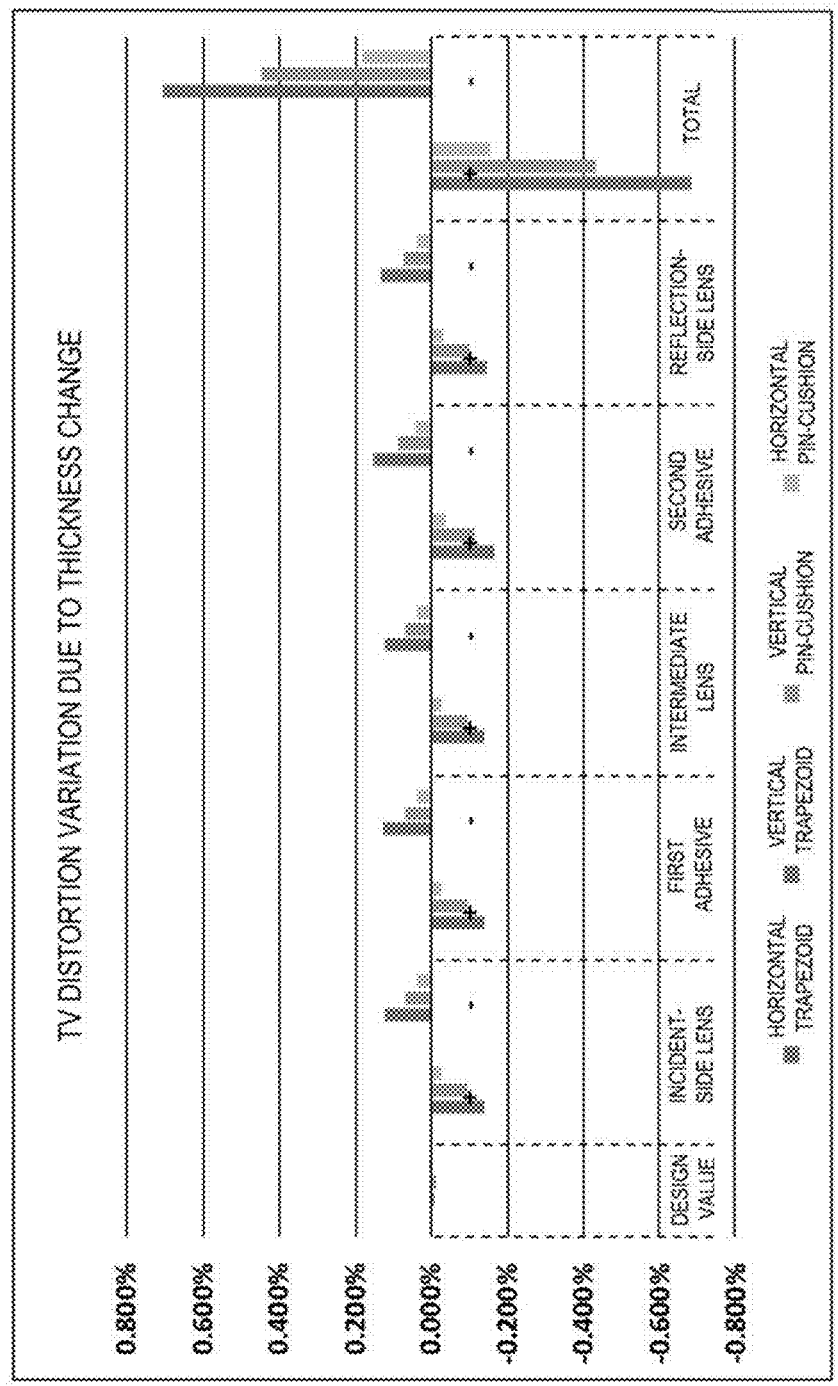
FIG. 16 is a graph of a relationship between the thickness of the lens unit and a TV distortion of a final image.

FIG. 16 is a graph showing a simulation of a relationship between the change in thickness of each of the members constituting the lens unit and the TV distortion in the final image to be projected to the screen S in the projection optical system constituted by the first optical system formed of the refracting optical system and the second optical system formed of the lens unit. The lens unit targeted by the simulation is one corresponding to the lens unit 50. Specifically, the lens unit is constituted by an incident-side lens which the ray from the first optical system enters, a reflection-side lens provided with a mirror formed of a coating layer, and an intermediate lens located between the incident-side lens and the reflection-side lens. In terms of the projection optical system 3A according to the present example, the incident-side lens corresponds to the 17-th lens L17. The reflection-side lens corresponds to the 19-th lens L19. The intermediate lens corresponds to the 18-th lens L18. Between the incident-side lens and the intermediate lens, there intervenes the first jointing member 54a adhering to these lenses. Between the intermediate lens and the reflection-side lens, there intervenes the second jointing member 54b adhering to these lenses.

In FIG. 16, the values in the vertical axis in the fields of the incident-side lens, the first adhesive, the intermediate lens, the second adhesive, and the reflection-side lens each represent the variation of the TV distortion when the thickness increases or decreases as much as 30 μm from the design value. These values represent when the thickness of one of the members changes alone, and the thicknesses of the other of the members are kept in the design values. Further, the value in the vertical axis in the field of the total represents the variation of the TV distortion when all of the incident-side lens, the first adhesive, the intermediate lens, the second adhesive, and the reflection-side lens each increase as much as 30 μm, or each decrease as much as 30 μm. It should be noted that when the vertical trapezoid of the TV distortion positively varies means the state in which an upper side of the screen becomes longer than the lower side, and when the vertical trapezoid thereof negatively varies means the reverse. When the vertical pin-cushion of the TV distortion positively varies means the state in which the height at right and left sides becomes larger than the height at the center of the screen, and when the vertical pin-cushion thereof negatively varies means the reverse. When the horizontal pin-cushion of the TV distortion positively varies means the state in which the width at right and left sides becomes larger than the width at the center of the screen, and when the horizontal pin-cushion thereof negatively varies means the reverse.

Figure 17:
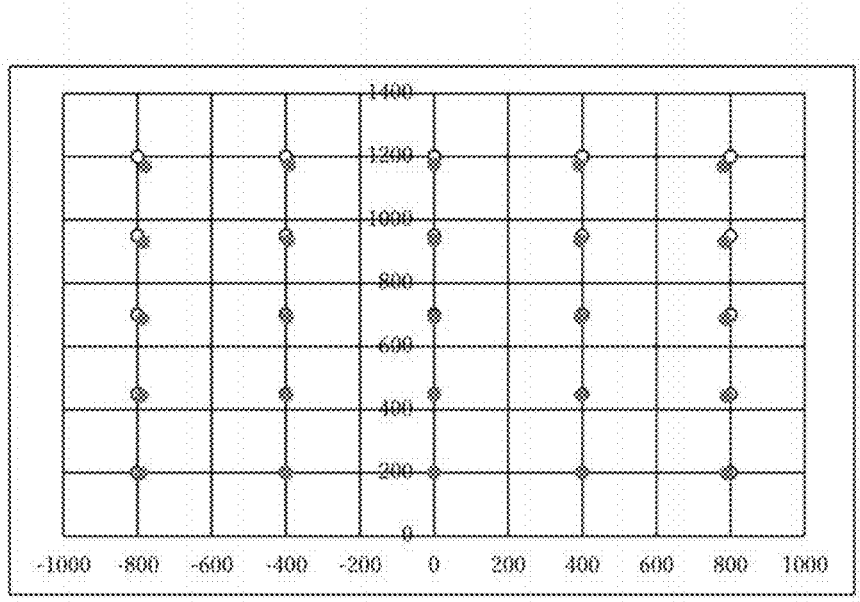
FIG. 17 is an explanatory diagram of a distortion aberration of the final image due to the thickness of the lens unit.
Figure 18:
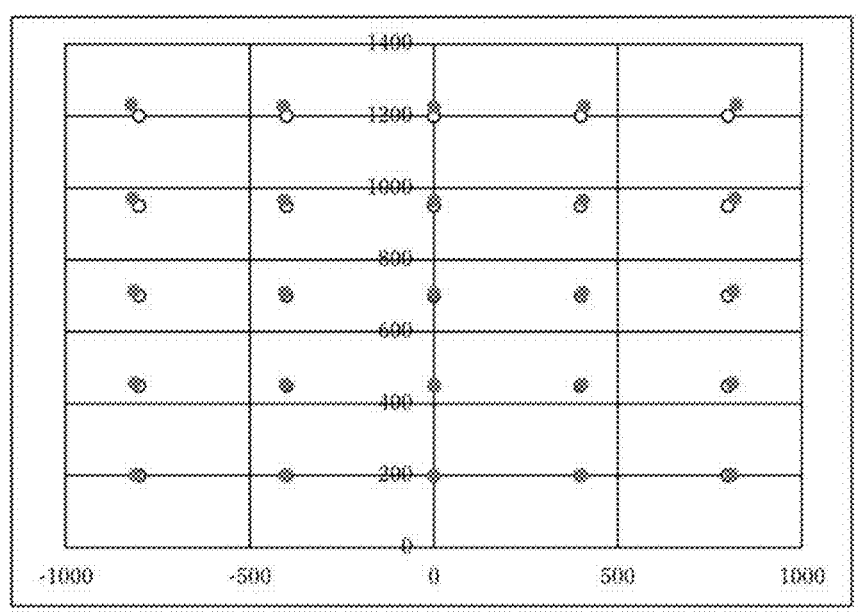
FIG. 18 is an explanatory diagram of a distortion aberration of the final image due to the thickness of the lens unit.

FIG. 17 is an explanatory diagram of the variation of the vertical trapezoid when the thickness of the lens unit takes the design value, and when all of the members of the incident-side lens, the first adhesive, the intermediate lens, the second adhesive, and the reflection-side lens each become thicker as much as 30 μm with respect to the points set at twenty places in the final image to be shown in the screen S. FIG. 18 is an explanatory diagram of the variation of the vertical trapezoid when the thickness of the lens unit takes the design value, and when all of the members of the incident-side lens, the first adhesive, the intermediate lens, the second adhesive, and the reflection-side lens each become thinner as much as 30 μm with respect to the points in the final image to be shown in the screen S. In FIG. 17 and FIG. 18, the white circles represent the positions of the points when the thickness of the lens unit takes the design value, and the gray circles represent the positions of the points when the thickness of the lens unit increases or decreases from the design value.

According to FIG. 16, it is understood that the TV distortion varies when the thickness of each of the incident-side lens, the first adhesive, the intermediate lens, the second adhesive, and the reflection-side lens increases or decreases. Further, it is also understood that when all of the thicknesses of the incident-side lens, the first adhesive, the intermediate lens, the second adhesive, and the reflection-side lens increase or decrease, the TV distortion significantly varies compared to the value of the TV distortion at the design value. Also in FIG. 17 and FIG. 18, it is understood that the TV distortion significantly varies compared to the value of the TV distortion at the design value when all of the thicknesses of the incident-side lens, the first adhesive, the intermediate lens, the second adhesive, and the reflection-side lens increase or decrease.

In contrast, from FIG. 16, it is understood that the TV distortion varies at a constant rate when the thickness of any one of the incident-side lens, the first adhesive, the intermediate lens, the second adhesive, and the reflection-side lens increases or decreases irrespective of what member increases or decreases in thickness. Therefore, it can be determined that the TV distortion can be suppressed by approximating the distance between the plane of incidence of the incident-side lens and the reflecting surface of the reflection-side lens as the total thickness of the jointed lens to the design value even when changing the thicknesses of the two members, namely the first adhesive and the second adhesive, which deform elastically.

From such a point of view, in the projection optical system 3A according to the present example, the second optical system 32 is formed of the lens unit 50 provided with the holding mechanism 55. Therefore, the distance between the 17-th-lens lateral surface L17a at the opposite side to the 19-th lens L19 in the 17-th lens L17 and the 19-th-lens lateral surface L19a at the opposite side to the 17-th lens L17 in the 19-th lens L19 can be kept in the preset distance T set in advance. Therefore, it is possible to prevent the TV distortion from occurring, and thus, it is possible to prevent the distortion aberration from occurring in the final image.

Figure 19:
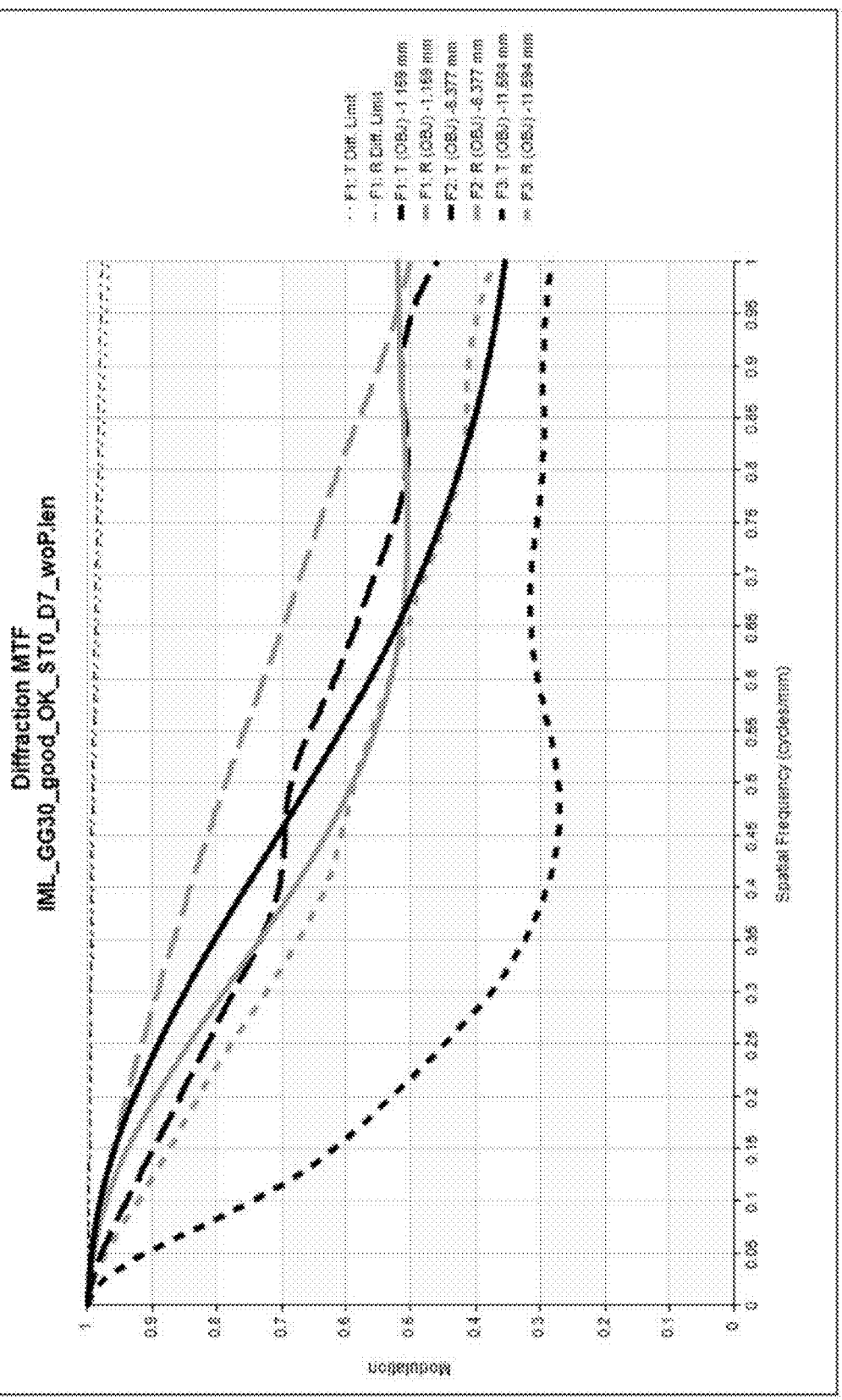
FIG. 19 is a diagram showing MTF by the elargement-side of the projection optical system according to Practical Example 4.

FIG. 19 is a diagram showing MTF by the elargement side of the projection optical system 3A. The horizontal axis of MTF represents the spatial frequency. The vertical axis of MTF represents a contrast reproduction ratio. In the drawing, the black graph represents a tangential ray (T), and the gray graph represents a radial ray (R). Further, in each of the tangential ray (T) and the radial ray (R), the solid line represents the light beam F1, the dashed line represents the light beam F2, and the dotted line represents the light beam F3. As shown in FIG. 16, the projection optical system 3A according to the present example is high in resolution.

Projection Optical System According to Practical Example 5

Figure 20:
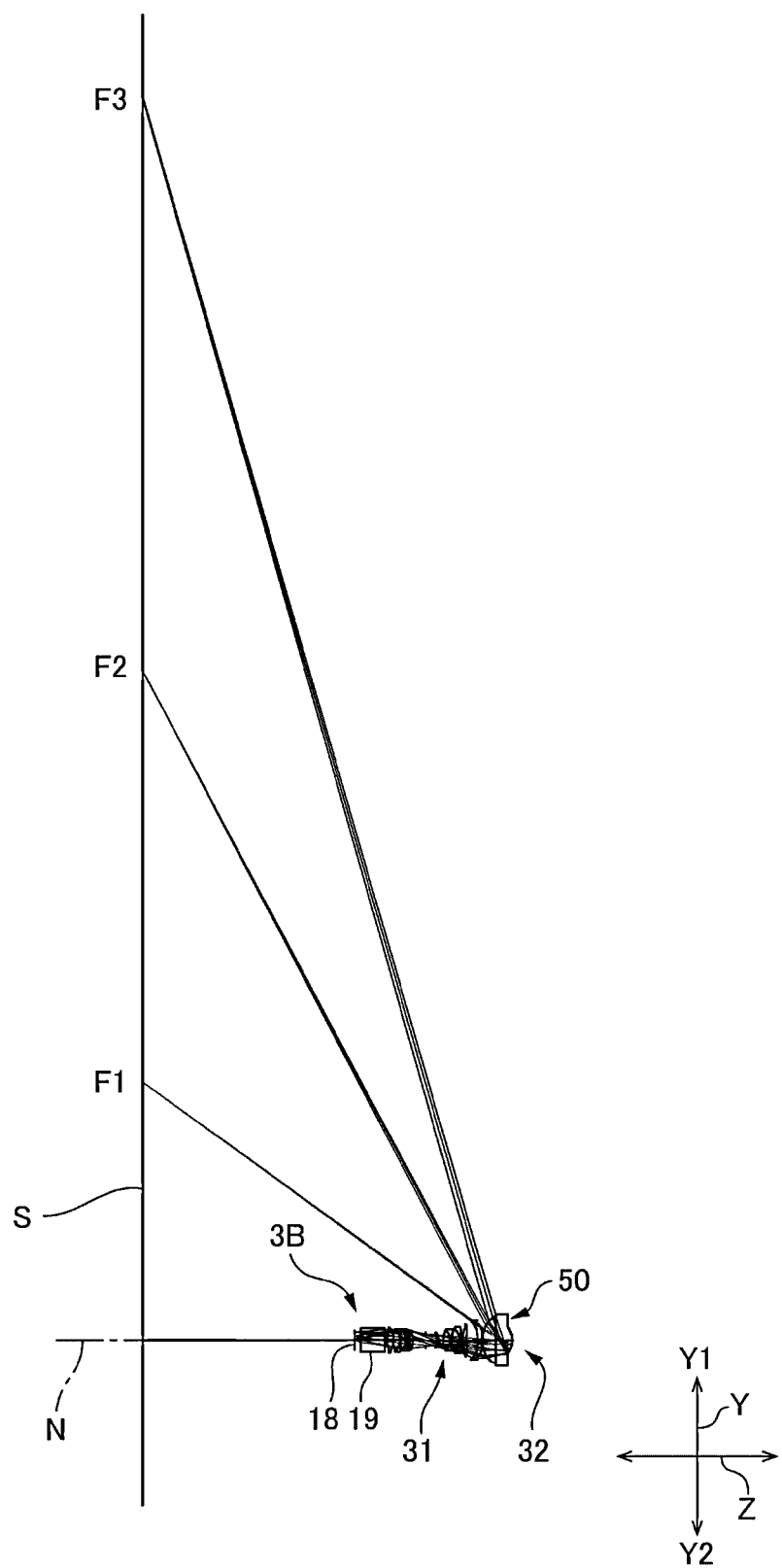
FIG. 20 is a ray chart schematically showing a whole of a projection optical system according to Practical Example 5.
Figure 21:
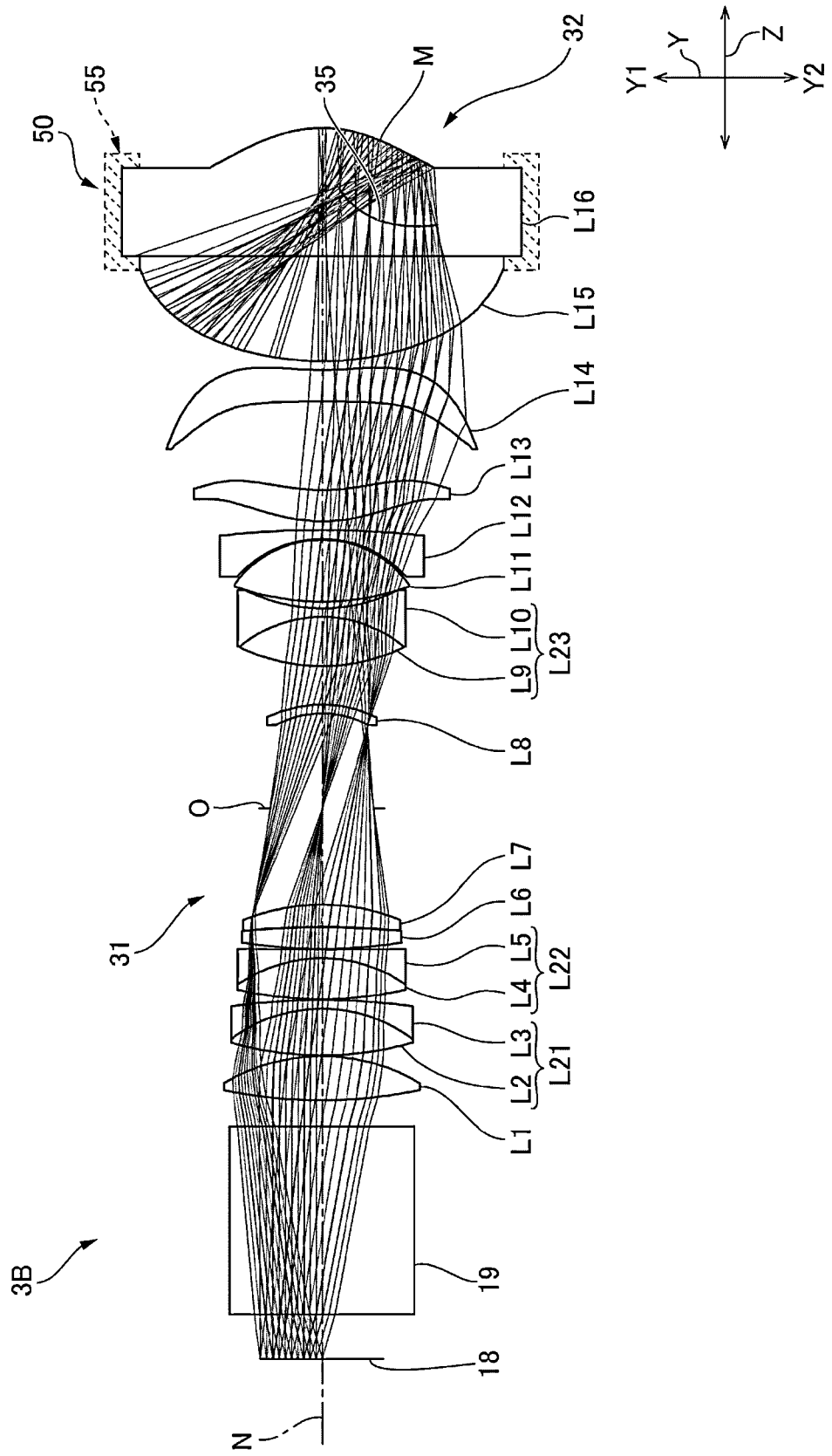
FIG. 21 is a ray chart of the projection optical system according to Practical Example 5.
Figure 22:
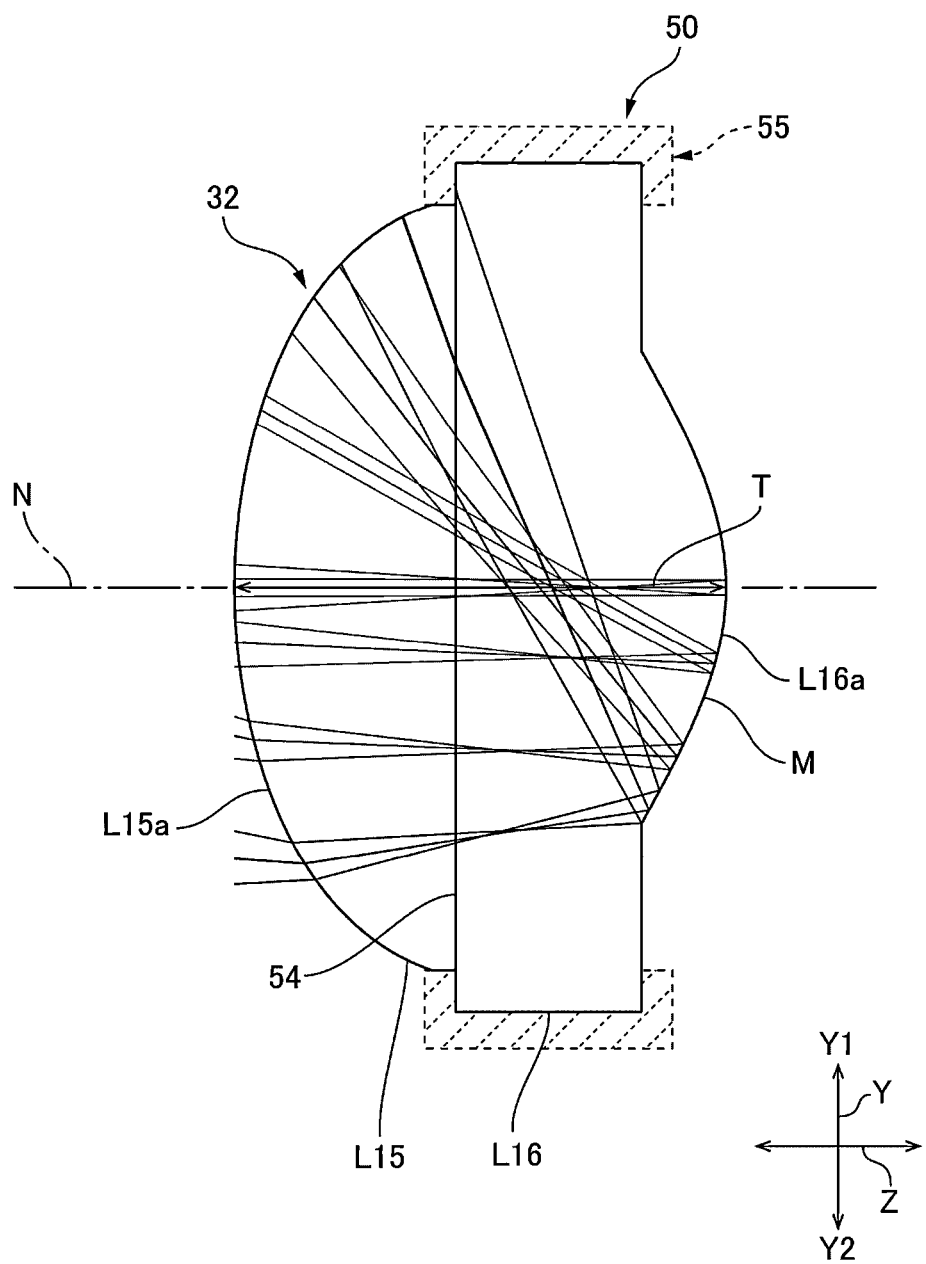
FIG. 22 is a ray chart of a second optical system in Practical Example 5.

FIG. 20 is a ray chart schematically showing a whole of a projection optical system according to Practical Example 5. FIG. 20 schematically shows the light beams which reach the screen S from the projection optical system 3B according to the present example with the light beams F1 through F3. FIG. 21 is a ray chart of the projection optical system according to Practical Example 5. FIG. 22 is a ray chart of a second optical system in Practical Example 5. It should be noted that since the projection optical system 3B according to Practical Example 5 is provided with constituents corresponding to those of the projection optical system 3A described above, the description will be presented denoting the corresponding constituents by the same reference symbols.

As shown in FIG. 20, the projection optical system 3B according to the present example is constituted by the first optical system 31 and the second optical system 32 arranged in sequence from the reduction-side toward the elargement-side. The first optical system 31 is a refracting optical system provided with a plurality of lenses. The second optical system 32 is the lens unit 50 having two lenses bonded to each other. As shown in FIG. 22, the second optical system 32 has the mirror M provided with the concavely curved surface. The projection optical system 3B forms an intermediate image 35 conjugate with a reduction-side imaging plane in the middle of the second optical system 32. Further, the projection optical system 3B forms a final image conjugate with the intermediate image 35 in an elargement-side imaging plane.

By the reduction-side imaging plane, there is disposed the liquid crystal panel 18 of the image formation section 2. The liquid crystal panel 18 forms the projection image in the upper side Y1 of the optical axis N. The intermediate image 35 is formed in the lower side Y2 of the optical axis N. The screen S is located in the upper side Y1 of the optical axis N. The intermediate image 35 is an image vertically flipped in the Y-axis direction with respect to the enlarged image to be formed in the screen S.

The first optical system 31 has the cross dichroic prism 19, and the fourteen lenses L1 through L14. The first lens L1 through the 14-th lens L14 are arranged in this order from the reduction side toward the elargement side. In the present example, the second lens L2 and the third lens L3 are bonded to each other to form the first jointed lens L21. The fourth lens L4 and the 5-th lens L5 are bonded to each other to form the second jointed lens L22. The 9-th lens L9 and the 10-th lens L10 are bonded to each other to form the third jointed lens L23.

As shown in FIG. 22, the second optical system 32 is constituted by a 15-th lens L15 and a 16-th lens L16. The jointing member 54 intervenes between the 15-th lens L15 and the 16-th lens L16. By an outer side in the redial direction of the 15-th lens L15 and the 16-th lens L16, there is disposed the holding mechanism 55 for keeping the distance between a 15-th-lens lateral surface Ll5a at an opposite side to the 16-th lens L16 in the 15-th lens L15 and a 16-th-lens lateral surface Ll6a at an opposite side to the 15-th lens L15 in the 16-th lens L16 in the preset distance T set in advance. Further, the second optical system 32 has the mirror M provided with the concavely curved surface. The mirror M is a reflective coating layer provided to the 16-th-lens lateral surface Ll6a. The mirror M reflects the ray from the first optical system 31 toward the upper side Y1.

Lens Data

The lens data of the projection optical system 3B is as follows. The surface numbers are provided in sequence from the reduction side toward the elargement side. The reference symbols are the reference symbols of the lenses and the mirrors. The data of the surface numbers not corresponding to any lenses or any mirrors are dummy data. The reference symbol R represents a curvature radius. The reference symbol D represents an axial surface distance. The reference symbol A represents an effective diameter. The units of R, D, and A are millimeter.

| REFERENCE SYMBOL | SURFACE NUMBER | SHAPE | R | D | GLASS MATERIAL | REFRACTION/ REFLECTION | A |
|---|---|---|---|---|---|---|---|
| | 0 | SPHERE | INFINITE | 5.0771 | | REFRACTION | 0.0000 |
| | 1 | SPHERE | INFINITE | 21.5089 | SBSL7 | REFRACTION | 7.6965 |
| | 2 | SPHERE | INFINITE | 3.0000 | | REFRACTION | 9.6301 |

-continued

| REFERENCE SYMBOL | SURFACE NUMBER | SHAPE | R | D | GLASS MATERIAL | REFRACTION/ REFLECTION | A |
|---|---|---|---|---|---|---|---|
| | 3 | SPHERE | INFINITE | 0.0000 | | REFRACTION | 10.0417 |
| 19 | 4 | SPHERE | INFINITE | 0.0000 | | REFRACTION | 10.0417 |
| | 5 | SPHERE | INFINITE | 0.0000 | | REFRACTION | 10.0417 |
| L1 | 6 | SPHERE | 54.8940 | 5.0419 | 451969.7922 | REFRACTION | 10.1721 |
| | 7 | SPHERE | −21.7949 | 0.1000 | | REFRACTION | 10.2241 |
| L2 | 8 | SPHERE | 38.0215 | 5.3428 | 483914.7992 | REFRACTION | 9.4314 |
| L3 | 9 | SPHERE | −17.1657 | 1.0000 | 838742.337 | REFRACTION | 9.0855 |
| | 10 | SPHERE | −73.3538 | 0.1000 | | REFRACTION | 8.9564 |
| L4 | 11 | SPHERE | 43.7198 | 4.6777 | 458568.7954 | REFRACTION | 8.6729 |
| L5 | 12 | SPHERE | −16.6916 | 1.0000 | 836961.3727 | REFRACTION | 8.3746 |
| | 13 | SPHERE | 582.5473 | 0.1000 | | REFRACTION | 8.3056 |
| L6 | 14 | SPHERE | 60.5198 | 2.4189 | 846663.2378 | REFRACTION | 8.2894 |
| | 15 | SPHERE | −101.1944 | 0.1004 | | REFRACTION | 8.1713 |
| L7 | 16 | SPHERE | −78.4977 | 2.5160 | 529212.7106 | REFRACTION | 8.1703 |
| | 17 | SPHERE | −23.6259 | 11.0686 | | REFRACTION | 8.1000 |
| O | 18 | SPHERE | INFINITE | 10.8450 | | REFRACTION | 5.9273 |
| L8 | 19 | SPHERE | −11.1826 | 1.0000 | 457192.8527 | REFRACTION | 5.3000 |
| | 20 | SPHERE | −14.2102 | 4.4064 | | REFRACTION | 5.6852 |
| L9 | 21 | SPHERE | 21.2833 | 5.6421 | 621528.3349 | REFRACTION | 8.1133 |
| L10 | 22 | SPHERE | −14.5583 | 1.0000 | 838219.3417 | REFRACTION | 8.1514 |
| | 23 | SPHERE | 19.4601 | 0.7648 | | REFRACTION | 8.7013 |
| L11 | 24 | SPHERE | 29.6398 | 7.0827 | 608267.3465 | REFRACTION | 8.7391 |
| | 25 | SPHERE | −12.2091 | 0.1000 | | REFRACTION | 9.2494 |
| L12 | 26 | SPHERE | −12.8956 | 1.0000 | 755000.5232 | REFRACTION | 9.1962 |
| | 27 | SPHERE | −110.0697 | 0.9959 | | REFRACTION | 10.6854 |
| L13 | 28 | ASPHERIC SURFACE | 16.8297 | 3.5898 | E48R_ZEON | REFRACTION | 12.9970 |
| | 29 | ASPHERIC SURFACE | 21.1795 | 10.1838 | | REFRACTION | 13.5215 |
| L14 | 30 | ASPHERIC SURFACE | −164.8780 | 3.5898 | E48R_ZEON | REFRACTION | 15.6318 |
| | 31 | ASPHERIC SURFACE | 38.8134 | 1.0000 | | REFRACTION | 16.5107 |
| | 32 | SPHERE | INFINITE | 0.0000 | | REFRACTION | 16.1444 |
| L15 | 33 | ASPHERIC SURFACE | 33.1742 | 12.0355 | Z330R_ZEON | REFRACTION | 15.9142 |
| L16 | 34 | SPHERE | INFINITE | 14.7119 | EFEL1 | REFRACTION | 13.9140 |
| M | 35 | ASPHERIC SURFACE | −13.8214 | 0.0000 | EFEL1 | REFLECTION | 12.8228 |
| L16 | 36 | SPHERE | INFINITE | −14.7119 | EFEL1 | REFRACTION | 21.8507 |
| L15 | 37 | SPHERE | INFINITE | −12.0355 | Z330R_ZEON | REFRACTION | 21.4485 |
| | 38 | ASPHERIC SURFACE | 33.1742 | −65.8130 | | REFRACTION | 21.1755 |
| | 39 | SPHERE | INFINITE | −56.8385 | | REFRACTION | 294.3897 |
| | 40 | SPHERE | INFINITE | −180.0883 | | REFRACTION | 493.6966 |
| | 41 | SPHERE | INFINITE | 0.0000 | | REFRACTION | 1125.1844 |

The aspherical coefficient of each of the aspheric surfaces is as follows.

| SURFACE NUMBER | 28 | 29 | 30 | 31 |
|---|---|---|---|---|
| Y CURVATURE RADIUS | 16.8296875 | 21.17946978 | −164.8779938 | 38.81338024 |
| CONIC CONSTANT (K) | −0.164206666 | −7.634008001 | 90 | 0 |
| 4-th-ORDER COEFFICIENT (A) | −1.15543E−04 | −6.14677E−05 | −9.39007E−06 | −1.74055E−04 |
| 6-th-ORDER COEFFICIENT (B) | 1.00751E−07 | −2.60513E−07 | −4.62232E−07 | 3.89048E−07 |
| 8-th-ORDER COEFFICIENT (C) | −6.25176E−10 | 1.05249E−09 | 1.18170E−09 | −8.39080E−10 |

| SURFACE NUMBER | 33 | 35 | 38 |
|---|---|---|---|
| Y CURVATURE RADIUS | 33.17421232 | −13.82144938 | 33.17421232 |
| CONIC CONSTANT (K) | 1.424812957 | −3.41862312 | 1.424812957 |

-continued

| | | | |
|---|---|---|---|
| 4-th-ORDER COEFFICIENT (A) | −8.30393E−06 | −3.65499E−05 | −8.30393E−06 |
| 6-th-ORDER COEFFICIENT (B) | 8.68876E−09 | 3.27225E−07 | 8.68876E−09 |
| 8-th-ORDER COEFFICIENT (C) | 1.32570E−10 | −1.53172E−09 | 1.32570E−10 |
| 10-th-ORDER COEFFICIENT (D) | −4.27302E−13 | 3.26740E−12 | −4.27302E−13 |
| 12-th-ORDER COEFFICIENT (E) | 3.93005E−16 | | 3.93005E−16 |

Functions and Advantages

Figure 23:
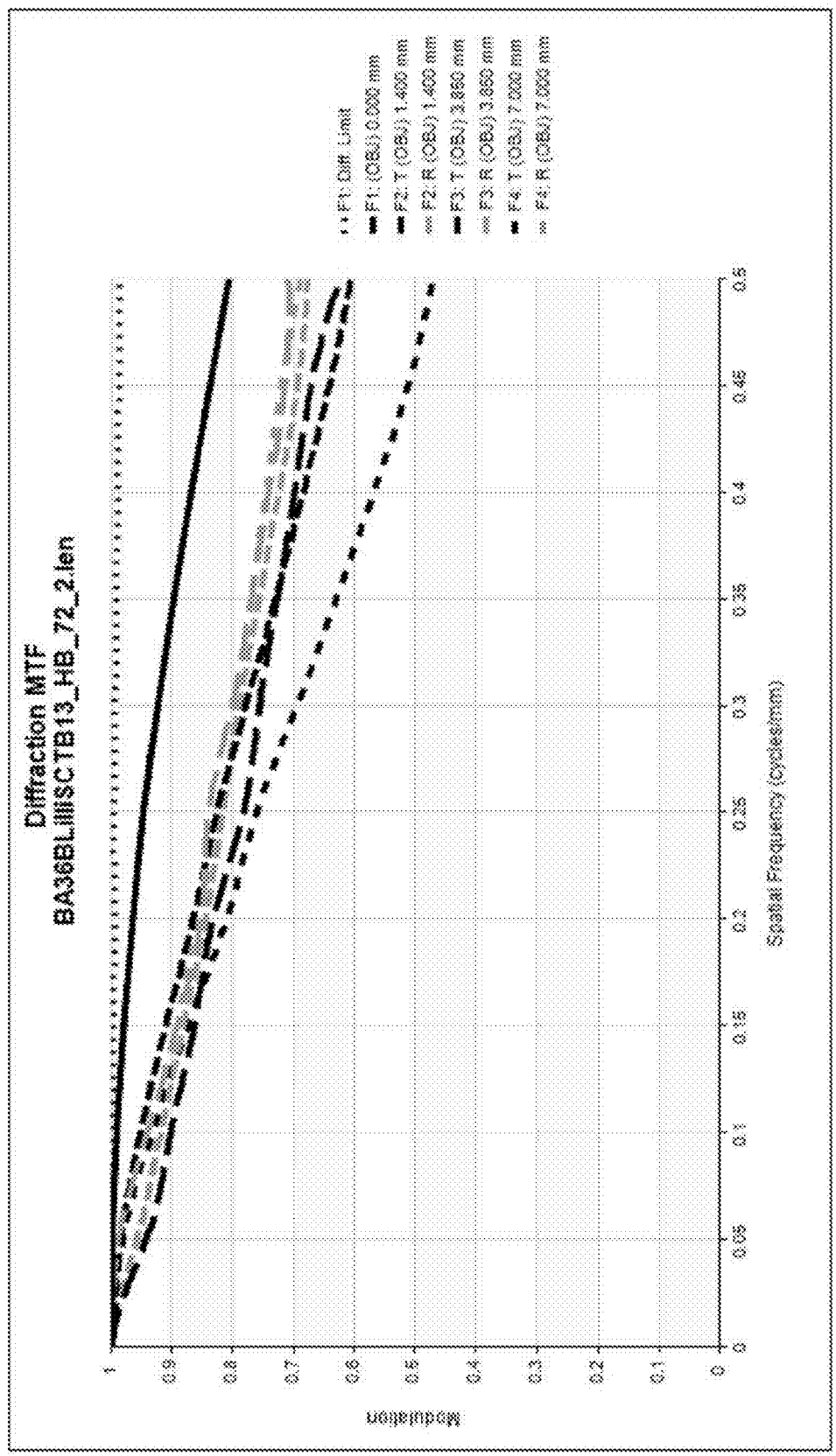
FIG. 23 is a diagram showing MTF by the elargement-side of the projection optical system according to Practical Example 5.

In the projection optical system 3B according to the present example, the second optical system 32 is formed of the lens unit 50 provided with the holding mechanism 55. Therefore, in the second optical system 32, the distance between the 15-th-lens lateral surface L15a of the 15-th lens L15 and the 16-th-lens lateral surface L16a of the 16-th lens L16 is kept in the preset distance T set in advance. Thus, it is possible to prevent the distortion aberration from occurring. FIG. 23 is a diagram showing MTF by the elargement side of the projection optical system 3B. As shown in FIG. 23, the projection optical system 3B according to the present example is high in resolution.

Projection Optical System According to Practical Example 6

Figure 24:
FIG. 24 is a ray chart schematically showing a whole of a projection optical system according to Practical Example 6.
Figure 25:
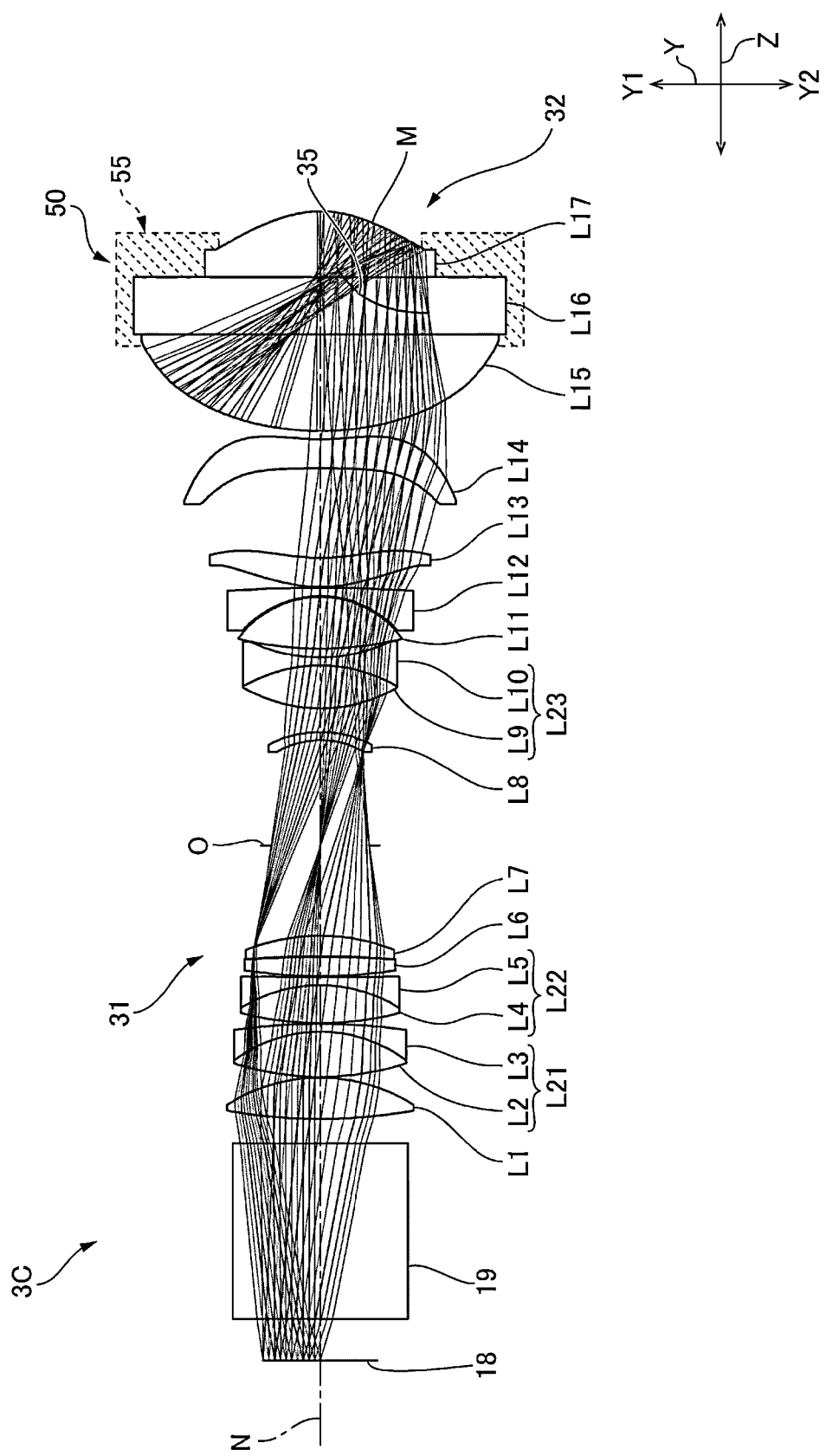
FIG. 25 is a ray chart of the projection optical system according to Practical Example 6.
Figure 26:
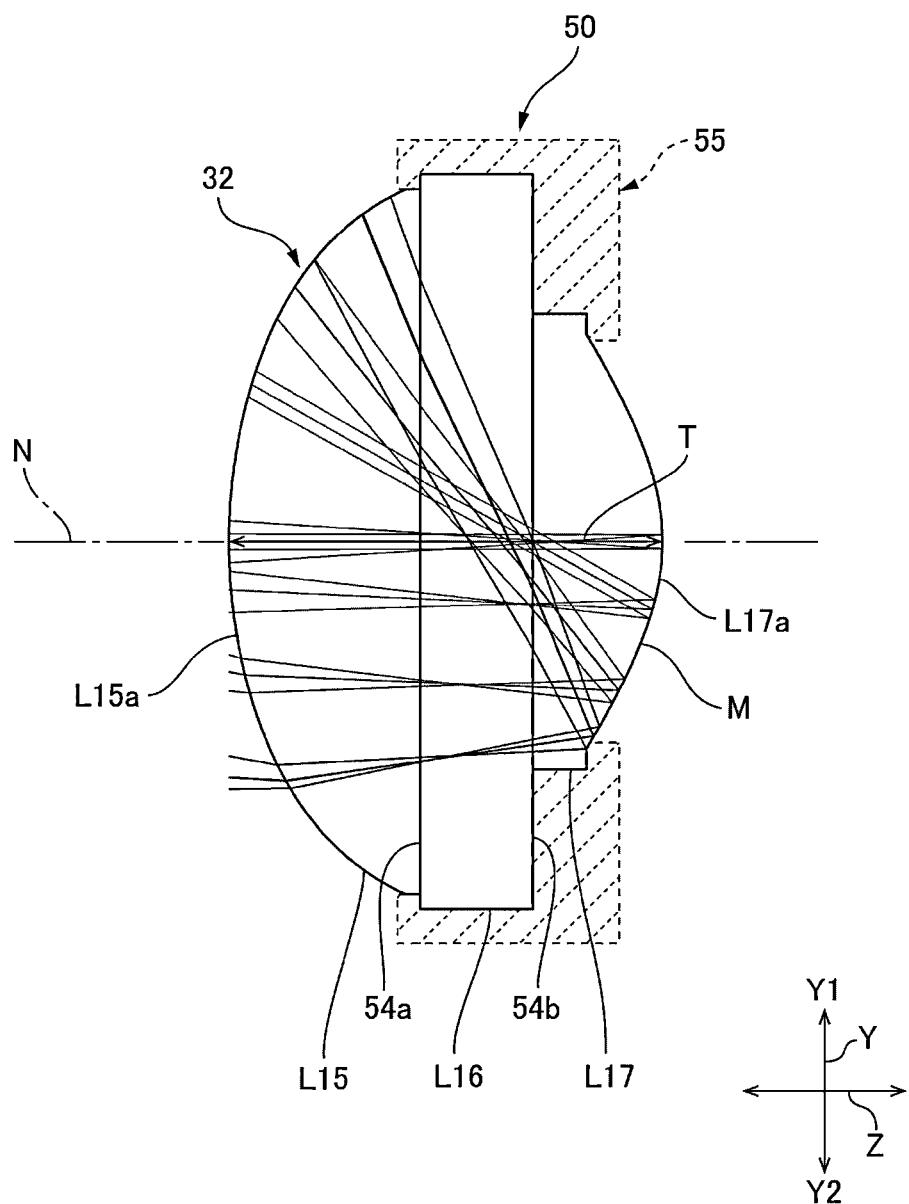
FIG. 26 is a ray chart of a second optical system in Practical Example 6.

FIG. 24 is a ray chart schematically showing a whole of a projection optical system according to Practical Example 6. FIG. 24 schematically shows the light beams which reach the screen S from the projection optical system 3C according to the present example with the light beams F1 through F3. FIG. 25 is a ray chart of the projection optical system according to Practical Example 6. FIG. 26 is a ray chart of a second optical system. It should be noted that since the projection optical system 3C according to Practical Example 6 is provided with constituents corresponding to those of the projection optical system 3C described above, the description will be presented denoting the corresponding constituents by the same reference symbols.

As shown in FIG. 24, the projection optical system 3C according to the present example is constituted by the first optical system 31 and the second optical system 32 arranged in sequence from the reduction-side toward the elargement-side. The first optical system 31 is a refracting optical system provided with a plurality of lenses. The second optical system 32 is the lens unit 50 having three lenses bonded to each other. As shown in FIG. 25, the second optical system 32 has the mirror M provided with the concavely curved surface. The projection optical system 3C forms the intermediate image 35 conjugate with the reduction-side imaging plane in the middle of the second optical system 32. Further, the projection optical system 3C forms the final image conjugate with the intermediate image 35 in the elargement-side imaging plane.

By the reduction-side imaging plane, there is disposed the liquid crystal panel 18 of the image formation section 2. The liquid crystal panel 18 forms the projection image in the upper side Y1 of the optical axis N. The intermediate image 35 is formed in the lower side Y2 of the optical axis N. The screen S is located in the upper side Y1 of the optical axis N. The intermediate image 35 is an image vertically flipped in the Y-axis direction with respect to the enlarged image to be formed in the screen S.

The first optical system 31 has the cross dichroic prism 19, and the fourteen lenses L1 through L14. The first lens L1 through the 14-th lens L14 are arranged in this order from the reduction side toward the elargement side. In the present example, the second lens L2 and the third lens L3 are bonded to each other to form the first jointed lens L21. The fourth lens L4 and the 5-th lens L5 are bonded to each other to form the second jointed lens L22. The 9-th lens L9 and the 10-th lens L10 are bonded to each other to form the third jointed lens L23.

As shown in FIG. 26, the second optical system 32 is constituted by a 15-th lens L15, a 16-th lens L16, and a 17-th lens L17. The first jointing member 54a intervenes between the 15-th lens and the 16-th lens, and the second jointing member 54b intervenes between the 16-th lens and the 17-th lens. By an outer side in the redial direction of the 15-th lens L15, the 16-th lens L16, and the 17-th lens L17, there is disposed the holding mechanism 55 for keeping the distance between a 15-th-lens lateral surface L15a at an opposite side to the 17-th lens L17 in the 15-th lens L15 and a 17-th-lens lateral surface L17a at an opposite side to the 15-th lens L15 in the 17-th lens L17 in the preset distance T set in advance. Further, the second optical system 32 has the mirror M provided with the concavely curved surface. The mirror M is a reflective coating layer provided to the 17-th-lens lateral surface L17a. The mirror M reflects the ray from the first optical system 31 toward the upper side Y1.

Lens Data

The lens data of the projection optical system 3C is as follows. The surface numbers are provided in sequence from the reduction side toward the elargement side. The reference symbols are the reference symbols of the lenses and the mirrors. The data of the surface numbers not corresponding to any lenses or any mirrors are dummy data. The reference symbol R represents a curvature radius. The reference symbol D represents an axial surface distance. The reference symbol A represents an effective diameter. The units of R, D, and A are millimeter.

| REFERENCE SYMBOL | SURFACE NUMBER | SHAPE | R | D | GLASS MATERIAL | REFRACTION/ REFLECTION | A |
|---|---|---|---|---|---|---|---|
| | 0 | SPHERE | INFINITE | 5.0771 | | REFRACTION | 0.0000 |
| | 1 | SPHERE | INFINITE | 21.5089 | SBSL7 | REFRACTION | 7.7525 |
| | 2 | SPHERE | INFINITE | 3.0000 | | REFRACTION | 9.8396 |
| | 3 | SPHERE | INFINITE | 0.0000 | | REFRACTION | 10.2842 |
| 19 | 4 | SPHERE | INFINITE | 0.0000 | | REFRACTION | 10.2842 |
| | 5 | SPHERE | INFINITE | 0.0000 | | REFRACTION | 10.2842 |

-continued

| REFERENCE SYMBOL | SURFACE NUMBER | SHAPE | R | D | GLASS MATERIAL | REFRACTION/ REFLECTION | A |
|---|---|---|---|---|---|---|---|
| L1 | 6 | SPHERE | 65.2535 | 5.0547 | 459231.8119 | REFRACTION | 10.4081 |
|  | 7 | SPHERE | −21.5572 | 0.1000 |  | REFRACTION | 10.4808 |
| L2 | 8 | SPHERE | 33.7121 | 5.5287 | 466801.7961 | REFRACTION | 9.6397 |
| L3 | 9 | SPHERE | −17.7888 | 1.0000 | 838592.34 | REFRACTION | 9.2943 |
|  | 10 | SPHERE | −76.9653 | 0.1000 |  | REFRACTION | 9.1655 |
| L4 | 11 | SPHERE | 39.5109 | 4.6487 | 449763.8088 | REFRACTION | 8.8624 |
| L5 | 12 | SPHERE | −18.1989 | 1.0000 | 836854.375 | REFRACTION | 8.5659 |
|  | 13 | SPHERE | 2344.7694 | 0.1000 |  | REFRACTION | 8.4650 |
| L6 | 14 | SPHERE | 60.9938 | 2.3391 | 846663.2378 | REFRACTION | 8.4276 |
|  | 15 | SPHERE | −135.2249 | 0.1027 |  | REFRACTION | 8.2862 |
| L7 | 16 | SPHERE | −97.0588 | 2.5154 | 503784.5221 | REFRACTION | 8.2856 |
|  | 17 | SPHERE | −24.9159 | 11.0686 |  | REFRACTION | 8.1000 |
| O | 18 | SPHERE | INFINITE | 12.9279 |  | REFRACTION | 6.0487 |
| L8 | 19 | SPHERE | −10.7625 | 1.0000 | 737044.5312 | REFRACTION | 5.3000 |
|  | 20 | SPHERE | −13.7917 | 2.9113 |  | REFRACTION | 5.7749 |
| L9 | 21 | SPHERE | 18.6067 | 5.2604 | 587629.3674 | REFRACTION | 8.1488 |
| L10 | 22 | SPHERE | −18.7692 | 1.0000 | 843594.2683 | REFRACTION | 8.1900 |
|  | 23 | SPHERE | 19.9365 | 1.0936 |  | REFRACTION | 8.6264 |
| L11 | 24 | SPHERE | 43.1388 | 6.3428 | 708049.282 | REFRACTION | 8.6290 |
|  | 25 | SPHERE | −12.4385 | 0.1000 |  | REFRACTION | 9.1114 |
| L12 | 26 | SPHERE | −12.7727 | 1.0000 | 755000.5232 | REFRACTION | 9.0592 |
|  | 27 | SPHERE | −175.0400 | 0.1000 |  | REFRACTION | 10.4570 |
| L13 | 28 | ASPHERIC SURFACE | 17.2789 | 3.5898 | E48R_ZEON | REFRACTION | 12.1337 |
|  | 29 | ASPHERIC SURFACE | 24.8934 | 10.9770 |  | REFRACTION | 12.4998 |
| L14 | 30 | ASPHERIC SURFACE | −162.0425 | 3.5898 | E48R_ZEON | REFRACTION | 14.2609 |
|  | 31 | ASPHERIC SURFACE | 32.6131 | 1.0000 |  | REFRACTION | 15.4862 |
|  | 32 | SPHERE | INFINITE | 0.0000 |  | REFRACTION | 15.4078 |
| L15 | 33 | ASPHERIC SURFACE | 33.8937 | 11.9019 | Z330R_ZEON | REFRACTION | 15.3575 |
| L16 | 34 | SPHERE | INFINITE | 7.0000 | EFEL1 | REFRACTION | 13.7122 |
|  | 35 | SPHERE | INFINITE | 8.0616 | Z330R_ZEON | REFRACTION | 13.0735 |
| L17, M | 36 | ASPHERIC SURFACE | −13.5088 | 0.0000 | Z330R_ZEON | REFLECTION | 12.8981 |
| L16 | 37 | SPHERE | INFINITE | −8.0616 | Z330R_ZEON | REFRACTION | 22.5140 |
|  | 38 | SPHERE | INFINITE | −7.0000 | EFEL1 | REFRACTION | 6.6445 |
| L15 | 39 | SPHERE | INFINITE | −11.9019 | Z330R_ZEON | REFRACTION | 16.2844 |
|  | 40 | ASPHERIC SURFACE | 33.8937 | −65.8130 |  | REFRACTION | 21.4543 |
|  | 41 | SPHERE | INFINITE | −56.8385 |  | REFRACTION | 299.7208 |
|  | 42 | SPHERE | INFINITE | −180.0883 |  | REFRACTION | 508.1933 |
|  | 43 | SPHERE | INFINITE | 0.0000 |  | REFRACTION | 1169.1953 |

The aspherical coefficient of each of the aspheric surfaces is as follows.

| SURFACE NUMBER | 28 | 29 | 30 | 31 |
|---|---|---|---|---|
| Y CURVATURE RADIUS | 17.27891973 | 24.89343087 | −162.042457 | 32.6131135 |
| CONIC CONSTANT (K) | 0.154036661 | −9.791011994 | 90 | 0 |
| 4-th-ORDER COEFFICIENT (A) | −1.14296E−04 | −6.32387E−05 −1.68865E−07 | −3.30805E−05 | −2.08195E−04 |
| 6-th-ORDER COEFFICIENT (B) | 1.22744E−07 |  | −4.85441E−07 | 4.55554E−07 |
| 8-th-ORDER COEFFICIENT (C) | −8.35882E−10 | 8.66939E−10 | 1.36489E−09 | −9.60761E−10 |

| SURFACE NUMBER | 33 | 36 | 40 |
|---|---|---|---|
| Y CURVATURE RADIUS | 33.89369796 | −13.50883191 | 33.89369796 |
| CONIC CONSTANT (K) | 1.07073038 | −3.463988043 | 1.07073038 |
| 4-th-ORDER COEFFICIENT (A) | −7.60572E−06 | −3.68891E−05 | −7.60572E−06 |
| 6-th-ORDER COEFFICIENT (B) | 8.47827E−09 | 2.94214E−07 | 8.47827E−09 |

| | | | |
|---|---|---|---|
| 8-th-ORDER COEFFICIENT (C) | 1.32167E−10 | −1.38970E−09 | 1.32167E−10 |
| 10-th-ORDER COEFFICIENT (D) | −4.27006E−13 | 3.15769E−12 | −4.27006E−13 |
| 12-th-ORDER COEFFICIENT (E) | 4.32766E−16 | | 4.32766E−16 |

Functions and Advantages

Figure 27:
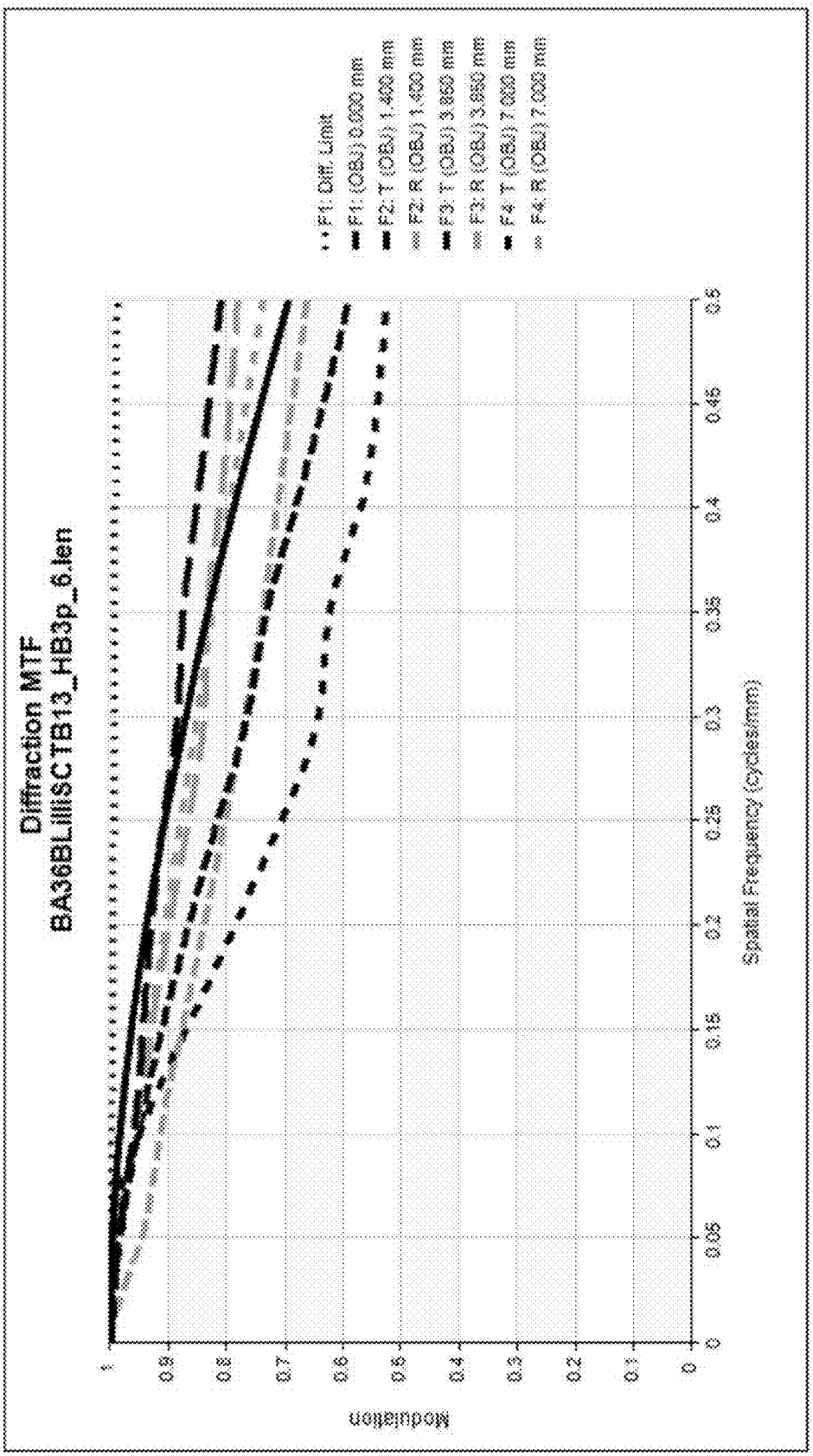
FIG. 27 is a diagram showing MTF by the elargement-side of the projection optical system according to Practical Example 6.

In the projection optical system 3C according to the present example, the second optical system 32 is formed of the lens unit 50 provided with the holding mechanism 55. Therefore, in the second optical system 32, the distance between the 15-th-lens lateral surface L15a of the 15-th lens L15 and the 17-th-lens lateral surface L17a of the 17-th lens L17 is kept in the preset distance T set in advance. Thus, it is possible to prevent the distortion aberration from occurring. FIG. 27 is a diagram showing MTF by the elargement side of the projection optical system 3C. As shown in FIG. 27, the projection optical system 3C according to the present example is high in resolution.

What is claimed is:

1. A lens unit comprising:
a jointed lens having a first optical member, a second optical member disposed on an optical axis of the first optical member, and a jointing member having a light transmissive property and disposed between the first optical member and the second optical member; and
a holding mechanism configured to hold the first optical member and the second optical member, wherein:
the holding mechanism holds the first and second optical members so that a distance along an optical axis direction of the optical axis between a first lateral surface at an opposite side to a second optical member side in the first optical member and a second lateral surface at an opposite side to a first optical member side in the second optical member becomes a preset distance,
the jointing member adheres to the first optical member and the second optical member so that the distance becomes the preset distance,
the holding mechanism holds the first and second optical members by placing a first protrusion that extends in a radial direction that is perpendicular to the optical axis against the first lateral surface and a second protrusion that extends in the radial direction that is perpendicular to the optical axis against the second lateral surface,
the first lateral surface and the second lateral surface are surfaces by which light passes,
a longitudinal direction of the first protrusion and the second protrusion is perpendicular to the optical axis,
the holding mechanism includes
a ring-like member disposed at an outer side in a radial direction of the first optical member and the second optical member,
a first spring disposed between the first optical member and the ring-like member, and
a second spring disposed between the second optical member and the ring-like member,
the ring-like member has a first positioning surface which the first optical member makes contact with, and a second positioning surface which the second optical member makes contact with,
the first optical member has a first reference surface configured to make contact with the first positioning surface,
the second optical member has a second reference surface configured to make contact with the second positioning surface,
the first spring presses the first optical member toward the ring-like member to thereby make the first reference surface make contact with the first positioning surface, and
the second spring presses the second optical member toward the ring-like member to thereby make the second reference surface make contact with the second positioning surface.

2. The lens unit according to claim 1, wherein the jointing member is an adhesive.

3. The lens unit according to claim 1, wherein the jointed lens further includes a third optical member disposed between the first optical member and the second optical member on the optical axis, and
the jointing member includes
a first jointing member disposed between the first optical member and the third optical member, the first jointing member adhering to the first optical member and the third optical member, and
a second jointing member disposed between the third optical member and the second optical member, the second jointing member adhering to the third optical member and the second optical member.

4. The lens unit according to claim 1, wherein the jointed lens has a reflective coating layer provided to a lateral surface of the second optical member.

5. A projection optical system comprising:
the lens unit according to claim 1 disposed between a reduction-side imaging plane and an enlargement-side imaging plane.

6. The projection optical system according to claim 5, further comprising:
a first optical system; and
a second optical system disposed at an enlargement-side of the first optical system, wherein
an intermediate image is formed inside the second optical system, and
the second optical system is formed of the lens unit.

7. A projector comprising:
a light source;
a light modulator configured to modulate light emitted from the light source to provide an image to the reduction-side imaging plane; and
a projection optical system according to claim 5 configured to project the image.

8. A projector comprising:
a light source;
a light modulator configured to modulate light emitted from the light source to provide an image to the reduction-side imaging plane; and a projection optical system according to claim 6 configured to project the image.

* * * * *